US010379516B2

(12) United States Patent
Endo et al.

(10) Patent No.: US 10,379,516 B2
(45) Date of Patent: Aug. 13, 2019

(54) MANAGEMENT DEVICE AND SYSTEM FOR CALCULATING A PREDICTED VALUE OF A MEASUREMENT LOCATION

(71) Applicant: FUJITSU LIMITED, Kawasaki-shi, Kanagawa (JP)

(72) Inventors: Hiroshi Endo, Atsugi (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 15/708,588

(22) Filed: Sep. 19, 2017

(65) Prior Publication Data
US 2018/0095437 A1 Apr. 5, 2018

(30) Foreign Application Priority Data

Oct. 3, 2016 (JP) ................................ 2016-195713

(51) Int. Cl.
*G05B 19/048* (2006.01)
*G05B 19/042* (2006.01)
*G05B 23/02* (2006.01)

(52) U.S. Cl.
CPC ....... *G05B 19/048* (2013.01); *G05B 19/0428* (2013.01); *G05B 23/0294* (2013.01); *G05B 2219/2614* (2013.01)

(58) Field of Classification Search
CPC .......... G05B 19/048; G05B 2219/2614; G05B 15/02; G05B 19/0428; G05B 23/0294

(Continued)

(56) References Cited

U.S. PATENT DOCUMENTS 8,180,494 B2 * 5/2012 Dawson ................. G05B 15/02
700/276
9,958,916 B2 * 5/2018 Ogawa ..................... G06F 1/206
(Continued)

FOREIGN PATENT DOCUMENTS

JP 2013-152552 8/2013
JP 2015-105779 6/2015

OTHER PUBLICATIONS

Masatoshi Ogawa, et al. "Application of Large-Scale database-based Online Modeling to Plant State Long-term Estimation", The Institute of Electrical Engineers of Japan, Transactions on Electronics, Information and Systems, vol. 131, No. 4, 2011, 4 pages (with English Abstract).

(Continued)

*Primary Examiner* — Chun Cao
(74) *Attorney, Agent, or Firm* — Xsensus LLP

(57) ABSTRACT

A management device includes a memory and a processor coupled to the memory. The processor is configured to collect measurement data from sensors installed in respective measurement locations including outside an installation room in which an information processing device is installed, in a gas path in an air-conditioning system of the installation room, and inside the installation room, the measurement data being data measured by the respective sensors. The processor is configured to store the measurement data in the memory. The processor is configured to delete unnecessary data from the measurement data stored in the memory. The processor is configured to calculate a predicted value in at least one measurement location of the measurement locations on basis of the measurement data from which the unnecessary data is deleted. The predicted value is a value of data predicted to be measured by any of the sensors.

9 Claims, 25 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 2010/0217454 | A1* | 8/2010 | Spiers | G05D 23/1932 |
| | | | | 700/300 |
| 2011/0303406 | A1* | 12/2011 | Takeda | H05K 7/20745 |
| | | | | 165/288 |
| 2012/0284216 | A1* | 11/2012 | Hamann | G06F 1/206 |
| | | | | 706/12 |
| 2012/0305661 | A1* | 12/2012 | Malchiondo | F24F 11/30 |
| | | | | 236/44 A |
| 2013/0191676 | A1 | 7/2013 | Mase et al. | |
| 2014/0316583 | A1* | 10/2014 | Ambriz | F24F 11/30 |
| | | | | 700/277 |
| 2016/0018124 | A1* | 1/2016 | Yamamoto | F24F 11/00 |
| | | | | 700/276 |
| 2018/0055544 | A1* | 3/2018 | Courtney | A61B 17/7052 |

OTHER PUBLICATIONS

Shun Ushida, et al. "Just-In-Time Approach to Nonlinear Identification and Control", Journal of The Society of Instrument and Control Engineers, vol. 44, No. 2, 2005, 7 pages (with English Translation).
Anders Stenman, "Just-in-Time Models with Applications to Dynamical Systems", Linkoping Studies in Science and Technology Thesis, No. 601, 1997, 109 pages.

\* cited by examiner

| OVERALL POWER CONSUMPTION | POWER CONSUMPTION OF AIR CONDITIONER A | POWER CONSUMPTION OF AIR CONDITIONER B | ... | POWER CONSUMPTION OF OUTSIDE AIR CONDITIONER X | POWER CONSUMPTION OF OUTSIDE AIR CONDITIONER Y | ... | POWER CONSUMPTION OF AIR-CONDITIONING SYSTEM |
|---|---|---|---|---|---|---|---|
| $P_{all}[1]$ | $P_A[1]$ | $P_B[1]$ | ... | $P_X[1]$ | $P_Y[1]$ | ... | $P_{cond}[1]$ |
| $P_{all}[2]$ | $P_A[2]$ | $P_B[2]$ | ... | $P_X[2]$ | $P_Y[2]$ | ... | $P_{cond}[2]$ |
| $P_{all}[3]$ | $P_A[3]$ | $P_B[3]$ | ... | $P_X[3]$ | $P_Y[3]$ | ... | $P_{cond}[3]$ |
| ... | ... | ... | ... | ... | ... | ... | ... |

FIG. 4

| MEASUREMENT TIME AND DATE | OUTSIDE AIR | | OUTLET POINT OF AIR CONDITIONER A | | ... | OVERALL POWER CONSUMPTION | ... | POWER CONSUMPTION OF AIR-CONDITIONING SYSTEM |
|---|---|---|---|---|---|---|---|---|
| | DRY-BULB TEMPERATURE | RELATIVE HUMIDITY | DRY-BULB TEMPERATURE | RELATIVE HUMIDITY | | | | |
| M[m] | To[m] | Ro[m] | Ts_A[m] | Rs_A[m] | ... | Pall[m] | ... | Pcond[m] |
| ... | ... | ... | ... | ... | ... | ... | ... | ... |
| M[m+7] | To[m+7] | Ro[m+7] | Ts_A[m+7] | Rs_A[m+7] | ... | Pall[m+7] | ... | Pcond[m+7] |
| M[m+8] | To[m+8] | Ro[m+8] | Ts_A[m+8] | Rs_A[m+8] | ... | Pall[m+8] | ... | Pcond[m+8] |
| M[m+9] | To[m+9] | Ro[m+9] | Ts_A[m+9] | Rs_A[m+9] | ... | Pall[m+9] | ... | Pcond[m+9] |
| ... | ... | ... | ... | ... | ... | ... | ... | ... |
| M[m−8] | To[m−8] | Ro[m−8] | Ts_A[m−8] | Rs_A[m−8] | ... | Pall[m−8] | ... | Pcond[m−8] |
| M[m−7] | To[m−7] | Ro[m−7] | Ts_A[m−7] | Rs_A[m−7] | ... | Pall[m−7] | ... | Pcond[m−7] |
| M[m−6] | To[m−6] | Ro[m−6] | Ts_A[m−6] | Rs_A[m−6] | ... | Pall[m−6] | ... | Pcond[m−6] |
| ... | ... | ... | ... | ... | ... | ... | ... | ... |
| M[n] | To[n] | Ro[n] | Ts_A[n] | Rs_A[n] | ... | Pall[n] | ... | Pcond[n] |

DURING MAINTENANCE (rows M[m+7] to M[m+9])

DURING FAILURE (rows M[m−8] to M[m−6])

FIG. 5B

| OVERALL POWER CONSUMPTION | ... | POWER CONSUMPTION OF AIR-CONDITIONING SYSTEM | POWER CONSUMPTION OF ICT SYSTEM |
|---|---|---|---|
| Pall[m] | ⋮ | Pcond[m] | Pict[m] |
| ... | ... | ... | ... |
| Pall[m+7] | ⋮ | Pcond[m+7] | Pict[m+7] |
| Pall[m+8] | ⋮ | Pcond[m+8] | Pict[m+8] |
| Pall[m+9] | ⋮ | Pcond[m+9] | Pict[m+9] |
| ... | ... | ... | ... |
| Pall[m−8] | ⋮ | Pcond[m−8] | Pict[m−8] |
| Pall[m−7] | ⋮ | Pcond[m−7] | Pict[m−7] |
| Pall[m−6] | ⋮ | Pcond[m−6] | Pict[m−6] |
| ... | ... | ... | ... |
| Pall[n] | ⋮ | Pcond[n] | Pict[n] |

| MEASUREMENT TIME AND DATE | OUTSIDE AIR | | OUTLET POINT OF AIR CONDITIONER A | | ... | POWER CONSUMPTION OF AIR-CONDITIONING SYSTEM | POWER CONSUMPTION OF ICT SYSTEM |
|---|---|---|---|---|---|---|---|
| | DRY-BULB TEMPERATURE | DEW-POINT TEMPERATURE | DRY-BULB TEMPERATURE | DEW-POINT TEMPERATURE | | | |
| $M[m]$ | $To[m]$ | $Do[m]$ | $Ts_A[m]$ | $Ds_A[m]$ | ... | $Pcond[m]$ | $Pict[m]$ |
| ... | ... | ... | ... | ... | ... | ... | ... |
| $M[m+7]$ | $To[m+7]$ | $Do[m+7]$ | $Ts_A[m+7]$ | $Ds_A[m+7]$ | ... | $Pcond[m+7]$ | $Pict[m+7]$ |
| $M[m+9]$ | $To[m+9]$ | $Do[m+9]$ | $Ts_A[m+9]$ | $Ds_A[m+9]$ | ... | $Pcond[m+9]$ | $Pict[m+9]$ |
| ... | ... | ... | ... | ... | ... | ... | ... |
| $M[m-8]$ | $To[m-8]$ | $Do[m-8]$ | $Ts_A[m-8]$ | $Ds_A[m-8]$ | ... | $Pcond[m-8]$ | $Pict[m-8]$ |
| $M[m-6]$ | $To[m-6]$ | $Do[m-6]$ | $Ts_A[m-6]$ | $Ds_A[m-6]$ | ... | $Pcond[m-6]$ | $Pict[m-6]$ |
| ... | ... | ... | ... | ... | ... | ... | ... |
| $M[n]$ | $To[n]$ | $Do[n]$ | $Ts_A[n]$ | $Ds_A[n]$ | ... | $Pcond[n]$ | $Pict[n]$ |

FIG. 13

| OUTSIDE AIR | | OUTLET POINT OF AIR CONDITIONER A | | ... | OUTLET POINT OF OUTSIDE AIR CONDITIONER X | | ... | COLD AISLE | | RETURN POINT OF AIR CONDITIONER A | | ... |
|---|---|---|---|---|---|---|---|---|---|---|---|---|
| DRY-BULB TEMPERATURE | DEW-POINT TEMPERATURE | DRY-BULB TEMPERATURE | DEW-POINT TEMPERATURE | ... | DRY-BULB TEMPERATURE | DEW-POINT TEMPERATURE | ... | DRY-BULB TEMPERATURE | DEW-POINT TEMPERATURE | DRY-BULB TEMPERATURE | DEW-POINT TEMPERATURE | ... |
| $To[i-3]$ | $Do[i-3]$ | $Ts_A[i-3]$ | $Ds_A[i-3]$ | ... | $Ts_X[i-3]$ | $Ds_X[i-3]$ | ... | $Tc[i-3]$ | $Dc[i-3]$ | $Tr_A[i-3]$ | $Dr_A[i-3]$ | ... |
| $To[i-2]$ | $Do[i-2]$ | $Ts_A[i-2]$ | $Ds_A[i-2]$ | ... | $Ts_X[i-2]$ | $Ds_X[i-2]$ | ... | $Tc[i-2]$ | $Dc[i-2]$ | $Tr_A[i-2]$ | $Dr_A[i-2]$ | ... |
| $To[i-1]$ | $Do[i-1]$ | $Ts_A[i-1]$ | $Ds_A[i-1]$ | ... | $Ts_X[i-1]$ | $Ds_X[i-1]$ | ... | $Tc[i-1]$ | $Dc[i-1]$ | $Tr_A[i-1]$ | $Dr_A[i-1]$ | ... |
| $To[i]$ | $Do[i]$ | $Ts_A[i]$ | $Ds_A[i]$ | ... | $Ts_X[i]$ | $Ds_X[i]$ | ... | $Tc[i]$ | $Dc[i]$ | $Tr_A[i]$ | $Dr_A[i]$ | ... |

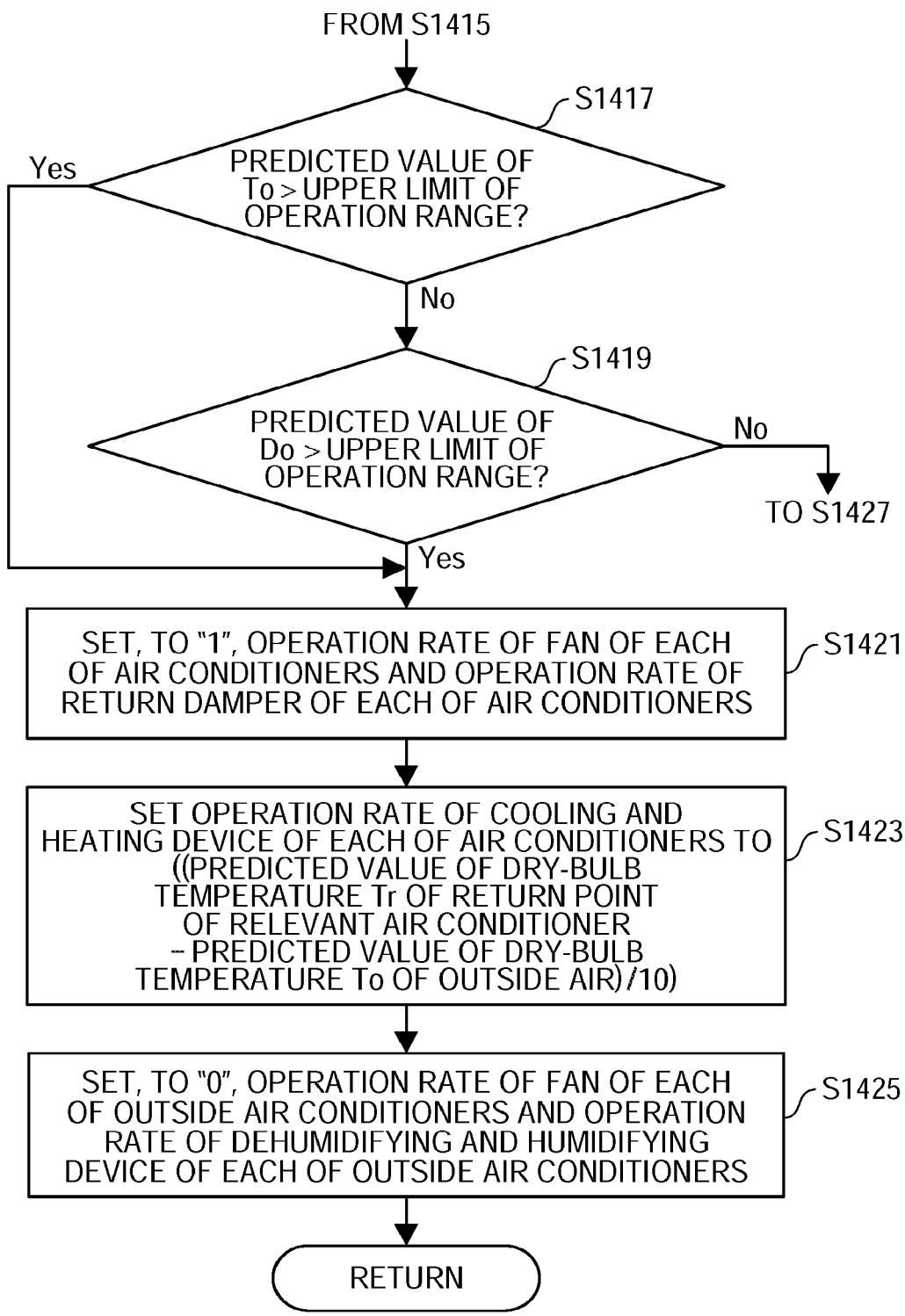

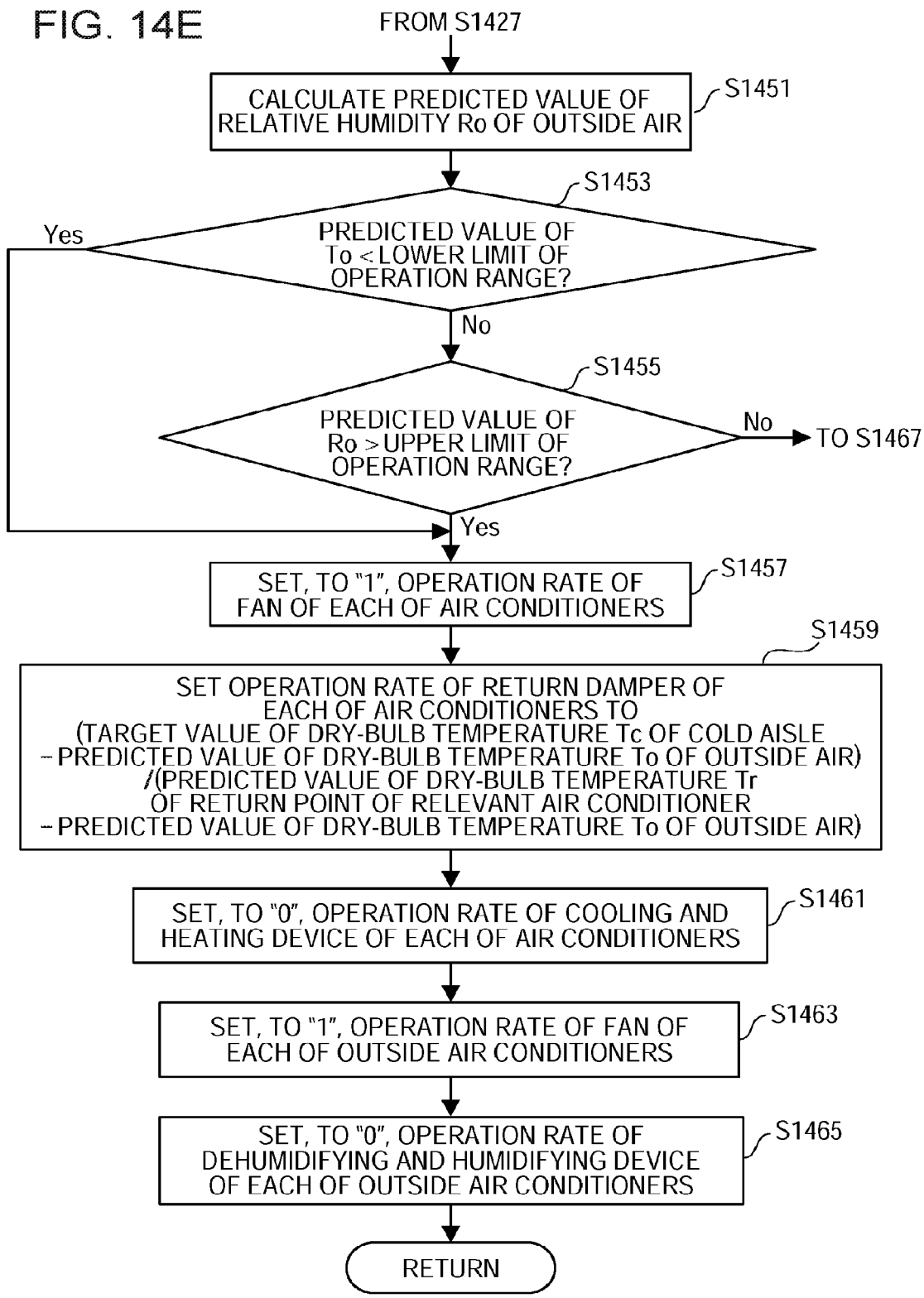

US 10,379,516 B2

MANAGEMENT DEVICE AND SYSTEM FOR CALCULATING A PREDICTED VALUE OF A MEASUREMENT LOCATION

CROSS-REFERENCE TO RELATED APPLICATION

This application is based upon and claims the benefit of priority of the prior Japanese Patent Application No. 2016-195713, filed on Oct. 3, 2016, the entire contents of which are incorporated herein by reference.

FIELD

The embodiments discussed herein are related to a management device and a management system.

BACKGROUND

In a data center in which many servers are installed, an air-conditioning system is used for suppressing an increase in air temperature in an installation room such as a server room in which the relevant servers are installed, for example.

In a case where changes in measurement parameters (a temperature and humidity, for example) related to air conditioning are predicted and individual equipments (an air conditioner and an outside air conditioner, for example) of the air-conditioning system are controlled based on that prediction, it is easy to maintain a required environment.

The above-described prediction of measured values is performed based on previous measurement data. Therefore, in an aspect, the degree of accuracy of the prediction of the measurement parameters depends on the quality of the previous measurement data.

Related techniques are disclosed in, for example, Japanese Laid-open Patent Publication No. 2013-152552 and Japanese Laid-open Patent Publication No. 2015-105779. Furthermore, Masatoshi OGAWA and Harutoshi OGAI, "Application of Large-Scale Database-Based Online Modeling to Plant State Long-Term Estimation", *IEEJ Transactions on Electronics, Information and Systems*, Vol. 131 No. 4, P. 718-721, 2011, Shun USHIDA and Hidenori KIMURA, "Just-In-Time Approach to Nonlinear Identification and Control", *Journal of The Society of Instrument and Control Engineers*, Vol. 44 No. 2, P. 102-106, 2005, and Anders Stenman, "Just-in-Time Models with Applications to Dynamical System", *Linkoping Studies in Science and Technology Thesis*, No. 601, March 1997 are cited as non-patent literatures.

SUMMARY

According to an aspect of the present invention, provided is a management device including a memory and a processor coupled to the memory. The processor is configured to collect measurement data from sensors installed in respective measurement locations including outside an installation room in which an information processing device is installed, in a gas path in an air-conditioning system of the installation room, and inside the installation room, the measurement data being data measured by the respective sensors. The processor is configured to store the measurement data in the memory. The processor is configured to delete unnecessary data from the measurement data stored in the memory. The processor is configured to calculate a predicted value in at least one measurement location of the measurement locations on basis of the measurement data from which the unnecessary data is deleted. The predicted value is a value of data predicted to be measured by any of the sensors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of extracted measurement data;

FIG. 5A and FIG. 5B are diagrams illustrating an example of measurement data to which variables are added;

FIG. 6 is a diagram illustrating an example of measurement data from which part of data is deleted;

FIG. 13 is a diagram illustrating examples of highly correlated variables;

FIG. 14A to FIG. 14F are diagrams illustrating a flow of a control process;

DESCRIPTION OF EMBODIMENTS

First Embodiment

Figure 1:
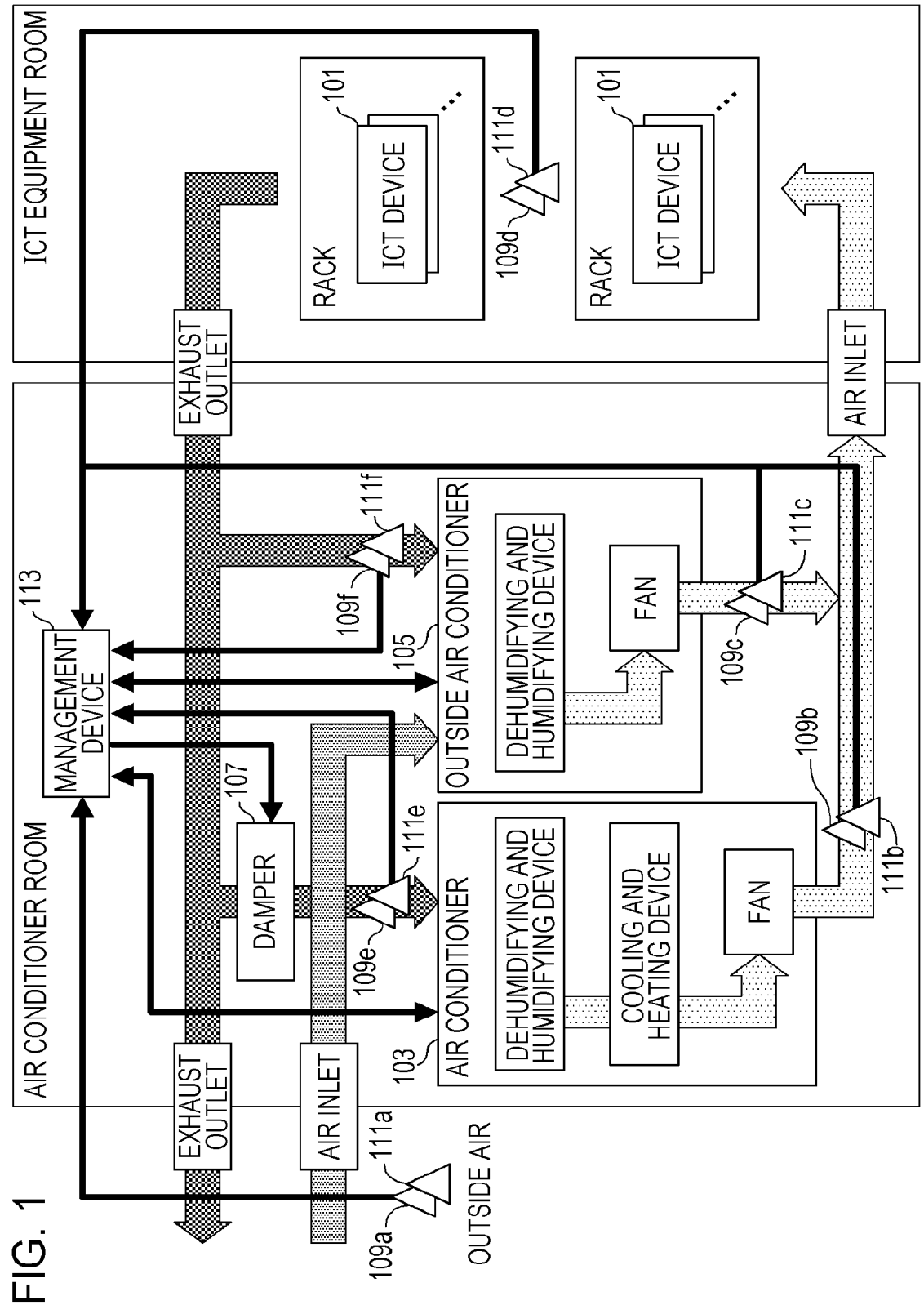
FIG. 1 is a diagram illustrating an exemplary configuration of a data center.

FIG. 1 illustrates an exemplary configuration of a data center. In an installation room such as an information and communication technology (ICT) equipment room or a server room, ICT devices 101 mounted in racks are installed. The ICT devices 101 each generate heat along of an operation. Accordingly, an air-conditioning system is used for cooling the ICT devices 101.

The air-conditioning system includes an air conditioner 103. While FIG. 1 illustrates one air conditioner 103, a plurality of air conditioners 103 may be included therein. The air conditioner 103 allows air to circulate, thereby adjusting humidity and a temperature. Therefore, the air conditioner 103 includes a dehumidifying and humidifying device for adjusting the humidity and a cooling and heating device for adjusting the temperature. In addition, the air conditioner 103 includes a fan for sending out air.

The air-conditioning system includes an outside air conditioner 105. The outside air conditioner 105 takes in outside air. The outside air conditioner 105 includes a dehumidifying and humidifying device for adjusting humidity. In addition, the outside air conditioner 105 includes a fan for sending out air.

The air sent out by the air conditioner 103 and the air sent out by the outside air conditioner 105 are sent in the ICT equipment room via an air inlet.

On the other hand, air in the ICT equipment room is returned to the air conditioner room via an exhaust outlet. The air returned to the air conditioner room is exhausted outdoors via an exhaust outlet of the air conditioner room. Part of the air returned to the air conditioner room is taken into the air conditioner 103 via a damper 107. Part of the air returned to the air conditioner room is taken into the outside air conditioner 105.

The air conditioner 103 and the outside air conditioner 105 are controlled by a management system including temperature sensors 109, humidity sensors 111, and a management device 113. As illustrated in FIG. 1, the temperature sensors 109 and the humidity sensors 111 to serve as measurement units are installed in a plurality of locations. A temperature sensor 109a and a humidity sensor 111a are installed outdoors. In other words, the temperature sensor 109a measures a dry-bulb temperature of outside air, and the humidity sensor 111a measures relative humidity of the outside air.

A temperature sensor 109b and a humidity sensor 111b are installed in the neighborhood of an outlet of the air conditioner 103 (hereinafter, called an outlet point of the air conditioner 103). The temperature sensor 109b measures a dry-bulb temperature of the air sent out by the air conditioner 103, and the humidity sensor 111b measures relative humidity of the air sent out by the air conditioner 103.

A temperature sensor 109c and a humidity sensor 111c are installed in the neighborhood of an outlet of the outside air conditioner 105 (hereinafter, called an outlet point of the outside air conditioner 105). The temperature sensor 109c measures a dry-bulb temperature of the air sent out by the outside air conditioner 105, and the humidity sensor 111c measures relative humidity of the air sent out by the outside air conditioner 105.

A temperature sensor 109d and a humidity sensor 111d are installed in a cold aisle. The cold aisle is a space, through which air from the air-conditioning system flows in the ICT equipment room, and corresponds to a space between columns of the racks, for example. The temperature sensor 109d measures a dry-bulb temperature of air in the cold aisle, and the humidity sensor 111d measures relative humidity of the air in the cold aisle.

A temperature sensor 109e and a humidity sensor 111e are installed in the neighborhood of a return inlet of the air conditioner 103 (hereinafter, called a return point of the air conditioner 103). The temperature sensor 109e measures a dry-bulb temperature of air returned to the air conditioner 103, and the humidity sensor 111e measures relative humidity of the air returned to the air conditioner 103.

A temperature sensor 109f and a humidity sensor 111f are installed in the neighborhood of a return inlet of the outside air conditioner 105 (hereinafter, called a return point of the outside air conditioner 105). The temperature sensor 109f measures a dry-bulb temperature of air returned to the outside air conditioner 105, and the humidity sensor 111f measures relative humidity of the air returned to the outside air conditioner 105.

The management device 113 collects data of the dry-bulb temperatures measured by the respective temperature sensors 109 and the relative humidity measured by the respective humidity sensors 111 from the respective sensors. Furthermore, data of power consumption in each of equipments of the air-conditioning system and power consumption of an entire facility is collected. Hereinafter, the power consumption of the entire facility is simply called overall power consumption. Based on the collected pieces of data, the management device 113 may control the individual equipments of the air-conditioning system.

Figure 2A:
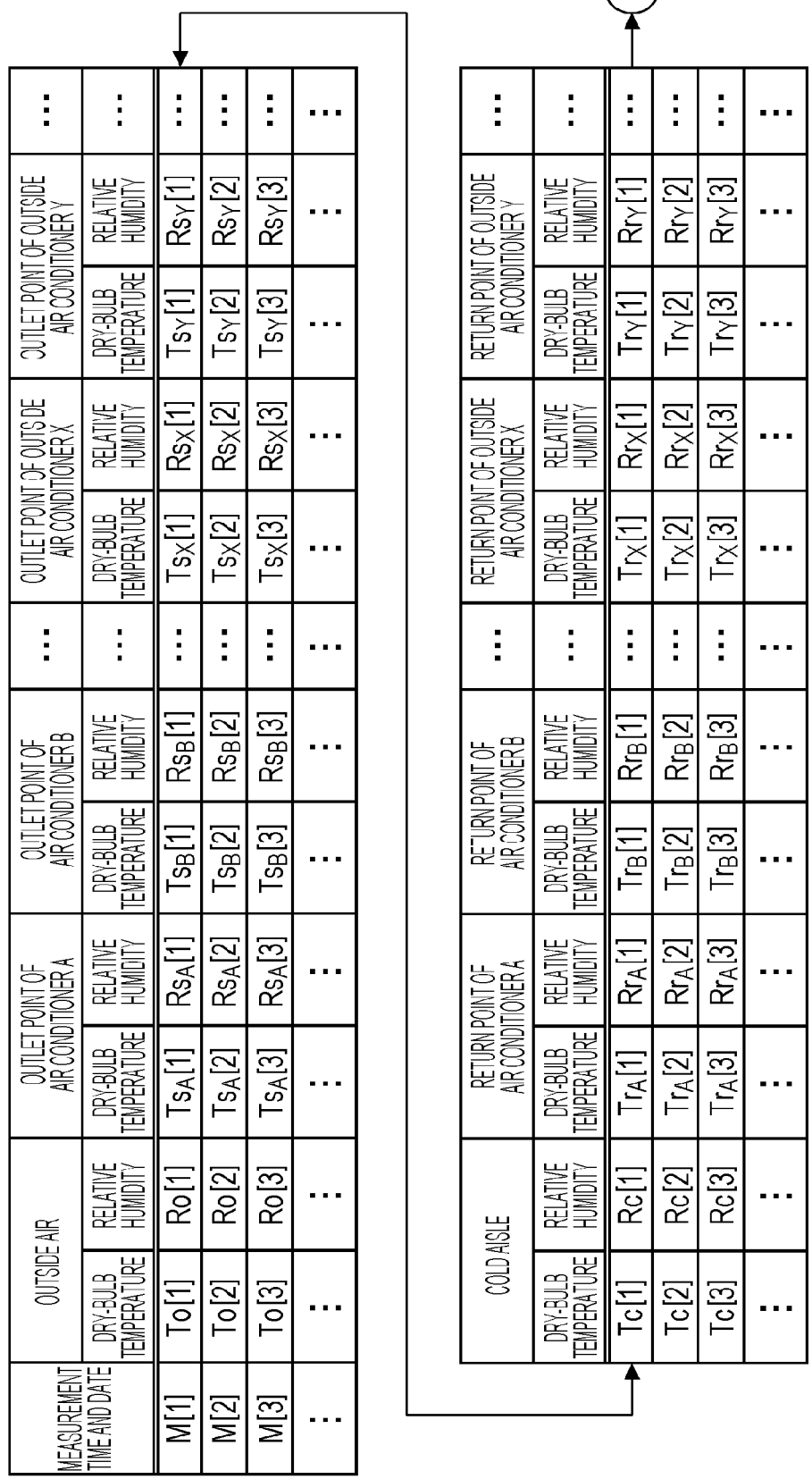
FIG. 2A and FIG. 2B are diagrams illustrating an example of measurement data.
Figure 2B:
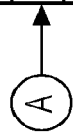

Measurement data collected by the management device 113 will be described. FIG. 2A and FIG. 2B illustrate an example of measurement data. The measurement data is linked via a terminal A. In this regard, however, the measurement data may have a form other than a table form. The measurement data in this example includes records corresponding to respective measurement timings. Records of the measurement data each include a field in which a measurement time and date is stored, fields in which dry-bulb temperatures in the respective measurement locations are stored, fields in which relative humidity in the respective measurement locations is stored, a field in which the overall power consumption is stored, fields in which power consumptions of the respective equipments of the air-conditioning system are stored, and a field in which the power consumption of the air-conditioning system is stored.

In this example, it is assumed that the air-conditioning system includes a plurality of air conditioners 103 and a plurality of outside air conditioners 105. The power consumption of the air-conditioning system is a value obtained by adding together the power consumptions of the respective equipments of the air-conditioning system. Items other than the measurement time and date are variables related to the air-conditioning system and an ICT system.

Figure 3A:
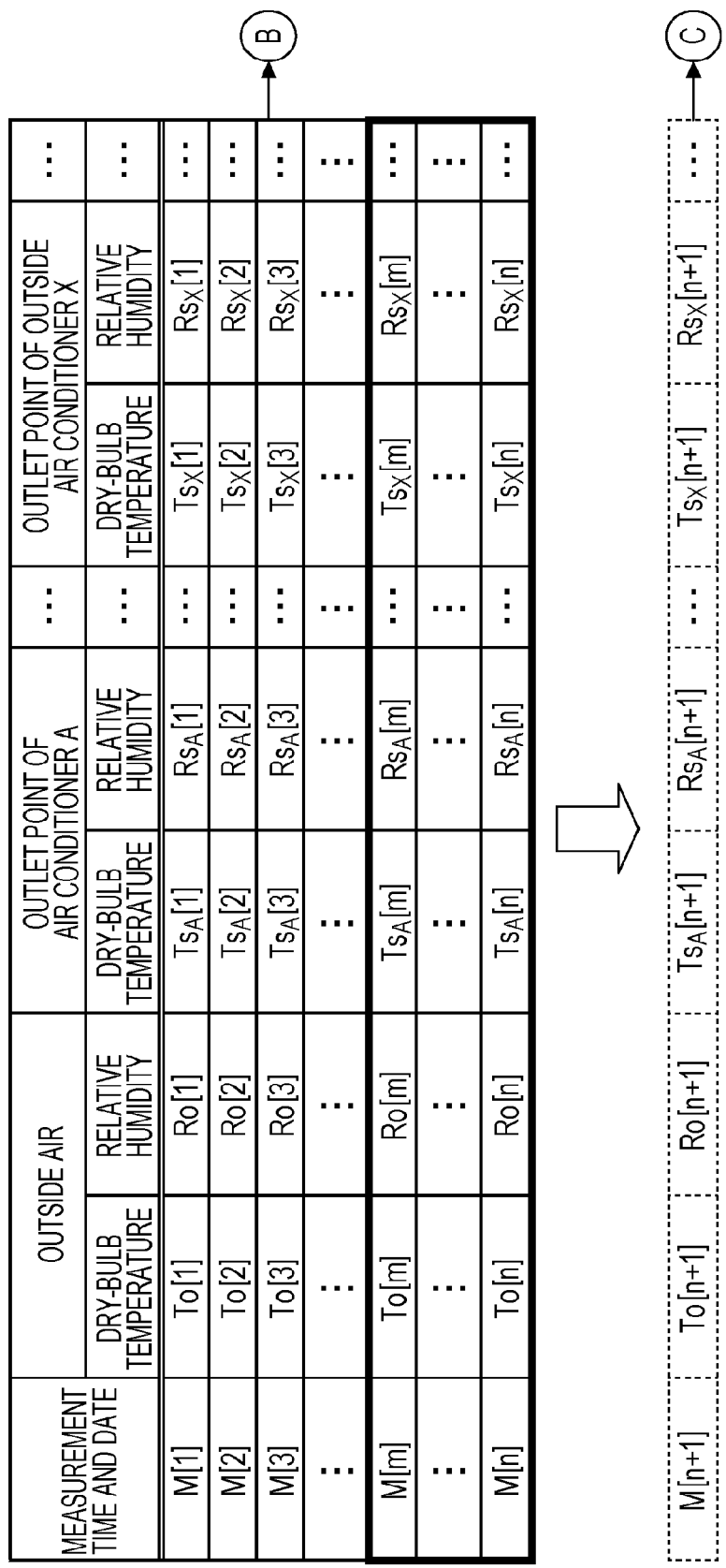
FIG. 3A and FIG. 3B are diagrams illustrating examples of measurement data and prediction data.
Figure 3B:
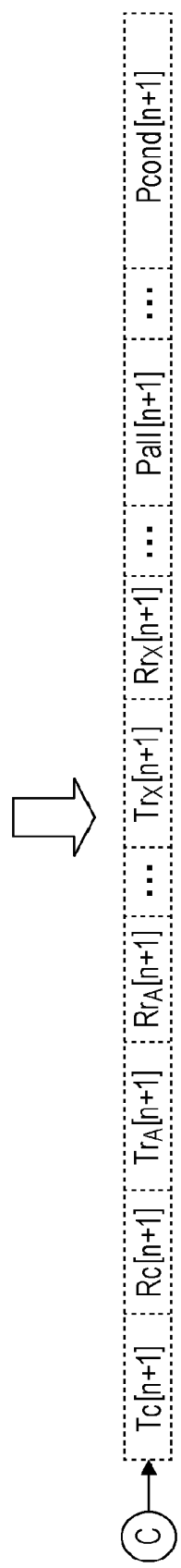

In order to control the individual equipments of the air-conditioning system, the management device 113 predicts values to be measured in the future. FIG. 3A and FIG. 3B illustrate examples of measurement data and prediction data. The measurement data illustrated in upper stages is linked via a terminal B. The prediction data illustrated in lower stages is linked via a terminal C. Based on measurement data in a time period between a present time and a time point preceding by a predetermined time length from the present time, predicted values of respective variables in the future are calculated. In this example, based on pieces of measurement data between a measurement time and date M[m] and a measurement time and date M[n], predicted values on a time and date M[n+1] of prediction are calculated. In a case where an interval between measurement timings is 10 minutes, values to be measured 10 minutes after the present time are predicted, for example. Note that, in a case of predicting a variable, a value to be referenced is not limited to the relevant variable. Variables other than the relevant variable may be referenced. Details will be described later.

FIG. 4 illustrates an example of extracted measurement data. Attention is concentrated on pieces of measurement data between the measurement time and date M[m] and the measurement time and date M[n], which serve as a predictive base. In a case where maintenance of an ICT equipment is performed on, for example, a measurement time and date M[m+8], there is a possibility that measurement data on the measurement time and date M[m+8] interferes with a prediction based on a normal state. In a case where an ICT equipment is out of order on a measurement time and date M[n−7], there is a possibility that measurement data on the measurement time and date M[n−7] interferes with a prediction based on a normal state.

Since depending on a dry-bulb temperature, relative humidity has an aspect of being unfitted for an indicator for capturing an influence of the amount of moisture.

While the power consumption of the ICT system is expected to be an indicator to influence a state of the air-conditioning system or the ICT equipment room, the power consumption of the ICT system is not included in the measurement data in this example.

Figure 5A:
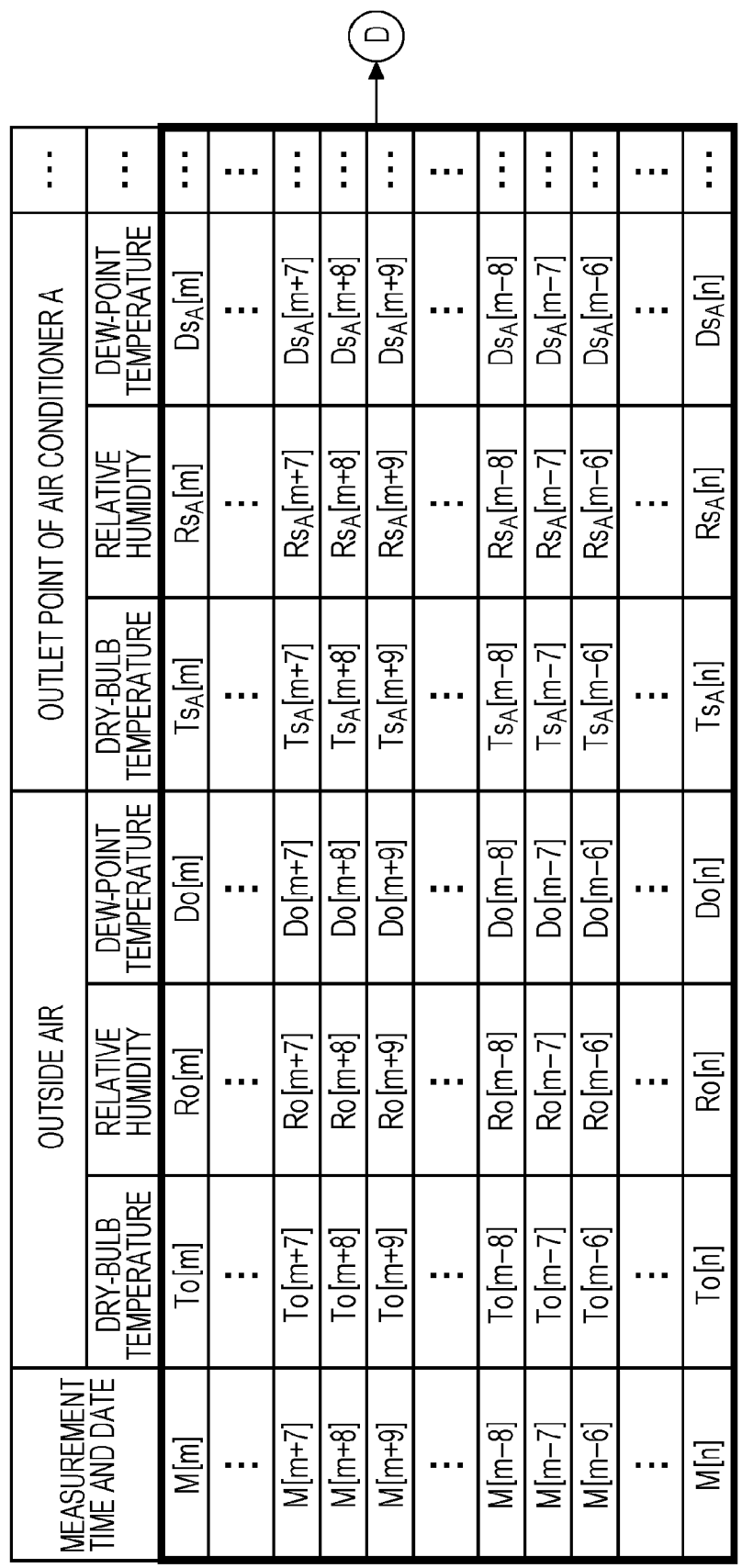

In the present embodiment, in view of these points, measurement data is modified. FIG. 5A and FIG. 5B illustrate an example of measurement data to which variables are added. The measurement data is linked via a terminal D. In the present embodiment, a dew-point temperature to serve as an indicator likely to capture the influence of the amount of moisture is used. While being calculated based on a dry-bulb temperature and relative humidity, the dew-point temperature is independent of the dry-bulb temperature. In this example, fields in which respective dew-point temperatures are to be stored are added to individual records.

In addition, the power consumption of the air-conditioning system is subtracted from the overall power consumption, thereby calculating the power consumption of the ICT system. Therefore, a field in which the power consumption of the ICT system is to be stored is added to each of the records.

While new data is added in this way, unnecessary data is deleted. FIG. 6 illustrates an example of measurement data from which part of data is deleted. Specifically, fields for storing therein relative humidity in respective measurement locations and a field for storing therein the overall power consumption are deleted.

Furthermore, records related to measurements during a maintenance period and records related to measurements during a failure period are deleted. In this way, based on measurement data from which the unnecessary data is deleted, a prediction is performed. A technique of the related art may be used for a method of predicting measurement parameters.

Based on a prediction result, individual equipments in the air-conditioning system are controlled. A technique of the related art may be used for a method of controlling the individual equipments in the air-conditioning system.

Figure 7:
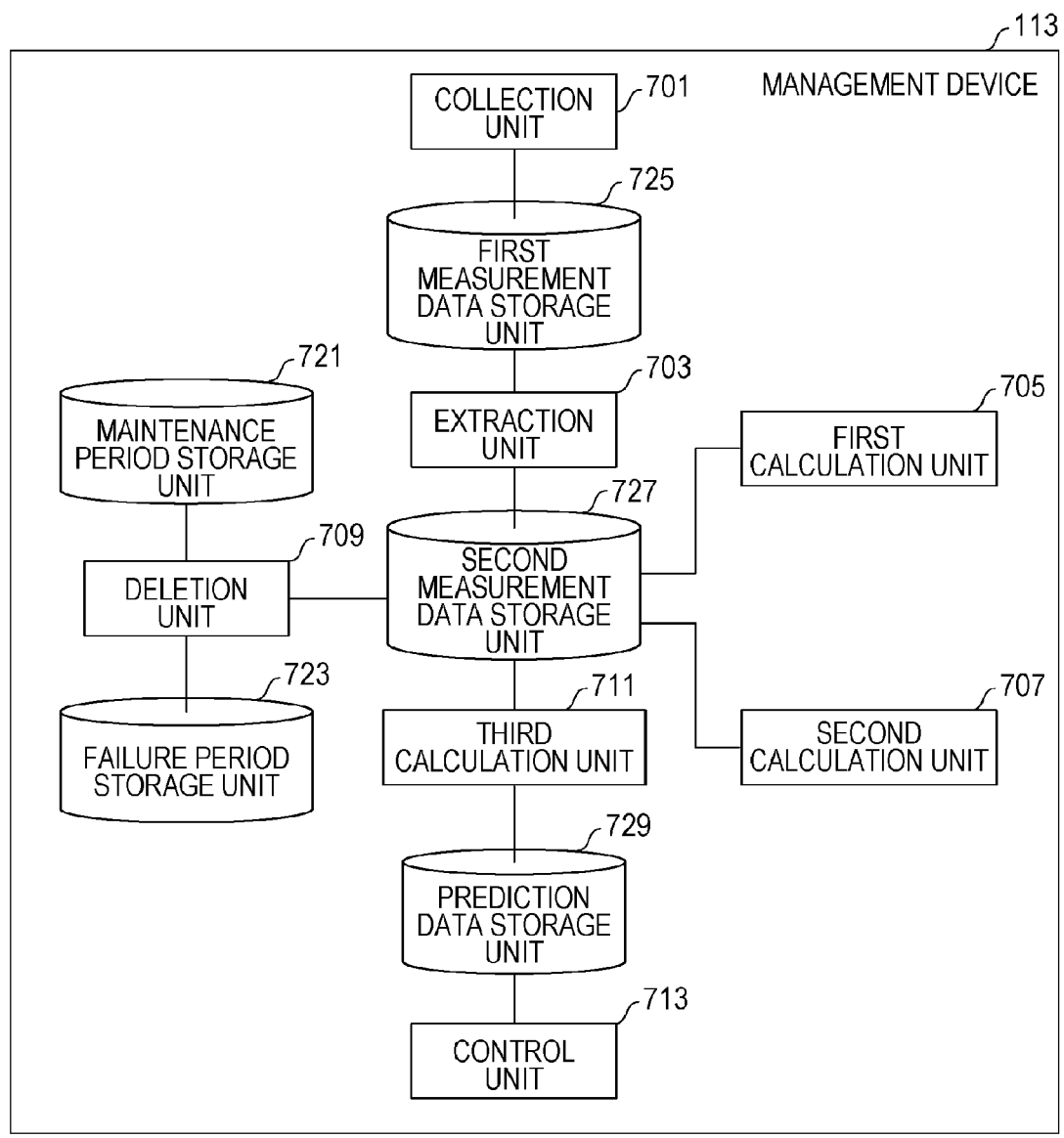
FIG. 7 is a diagram illustrating an exemplary functional configuration of a management device.

Hereinafter, an operation of the management device 113 will be described. FIG. 7 illustrates an exemplary functional configuration of the management device 113. The management device 113 includes a collection unit 701, an extraction unit 703, a first calculation unit 705, a second calculation unit 707, a deletion unit 709, a third calculation unit 711, a control unit 713, a maintenance period storage unit 721, a failure period storage unit 723, a first measurement data storage unit 725, a second measurement data storage unit 727, and a prediction data storage unit 729.

The collection unit 701 collects measurement data, which indicates measured values measured by the sensors, from the respective sensors. The collection unit 701 stores the measurement data in the first measurement data storage unit 725. Specifically, at a timing of collection, the collection unit 701 acquires dry-bulb temperatures measured by the respective temperature sensors 109. In a similar way, the collection unit 701 acquires relative humidity measured by the respective humidity sensors 111. The collection unit 701 also acquires power consumption in each of the air conditioners 103 and the outside air conditioners 105. The collection unit 701 calculates the power consumption of the air-conditioning system. The collection unit 701 also calculates the overall power consumption.

The extraction unit 703 extracts, from the entire measurement data stored in the first measurement data storage unit 725, part of the measurement data, which is to be used for a prediction. The first calculation unit 705 calculates dew-point temperatures in a first calculation process. The second calculation unit 707 calculates the power consumption of the ICT system in a second calculation process. The deletion unit 709 deletes unnecessary data. The third calculation unit 711 predicts values to be measured in the future. The control unit 713 controls, based on predicted values, individual equipments of the air-conditioning system.

The maintenance period storage unit 721 stores therein information regarding maintenance periods. It is assumed that the maintenance periods are stored at a time point of initiating a main process (described later). The failure period storage unit 723 stores therein information regarding failure periods. It is assumed that the failure periods are stored at the time point of initiating the main process.

The first measurement data storage unit 725 stores therein first measurement data. The first measurement data is as illustrated in FIG. 2A and FIG. 2B, for example. The second measurement data storage unit 727 stores therein second measurement data. The second measurement data is as illustrated in FIG. 4 to FIG. 6, for example. The prediction data storage unit 729 stores therein prediction data.

Figure 17:
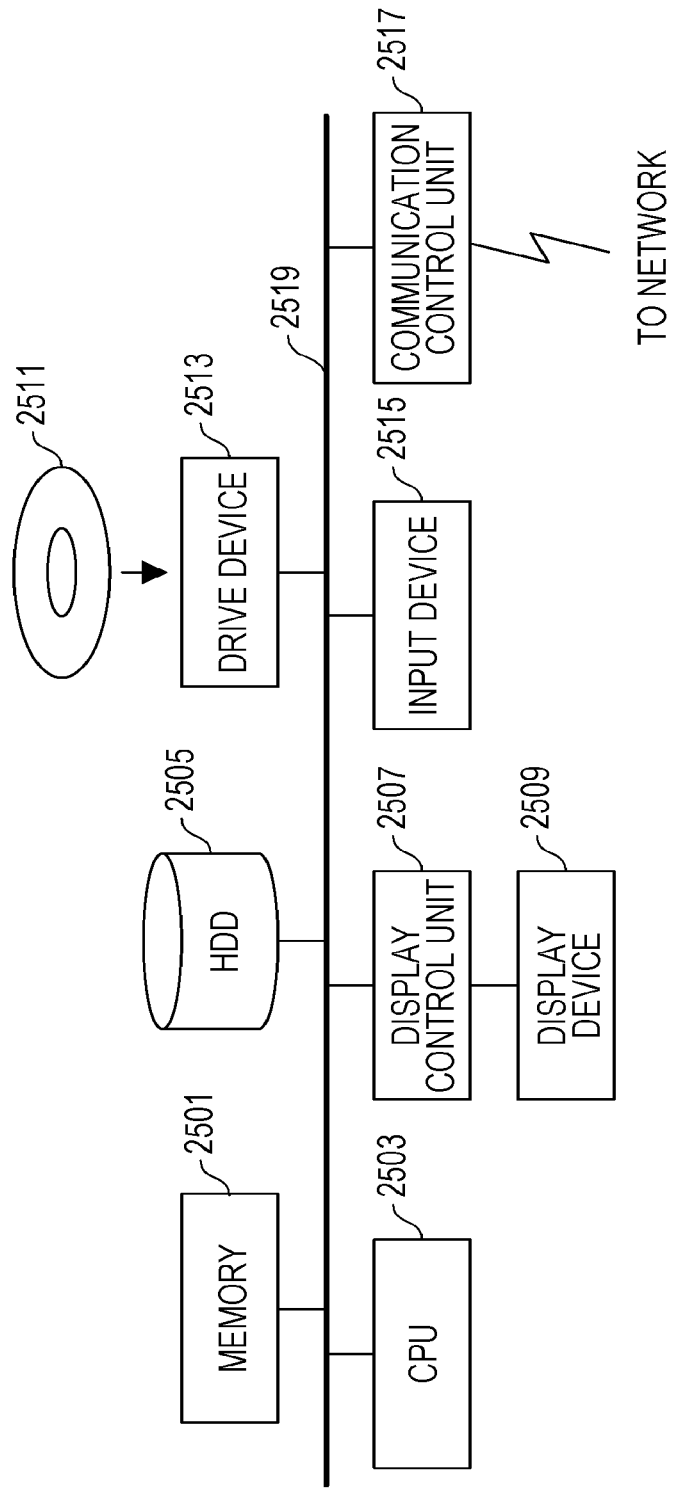
FIG. 17 is a diagram illustrating an exemplary hardware configuration of a computer.

The collection unit 701, the extraction unit 703, the first calculation unit 705, the second calculation unit 707, the deletion unit 709, the third calculation unit 711, and the control unit 713 described above, are realized by using hardware resources (for example, as illustrated in FIG. 17) and a program that causes a processor to perform processes to be described below.

The maintenance period storage unit 721, the failure period storage unit 723, the first measurement data storage unit 725, the second measurement data storage unit 727, and the prediction data storage unit 729, described above, are realized by using hardware resources (for example, as illustrated in FIG. 17).

Figure 8:
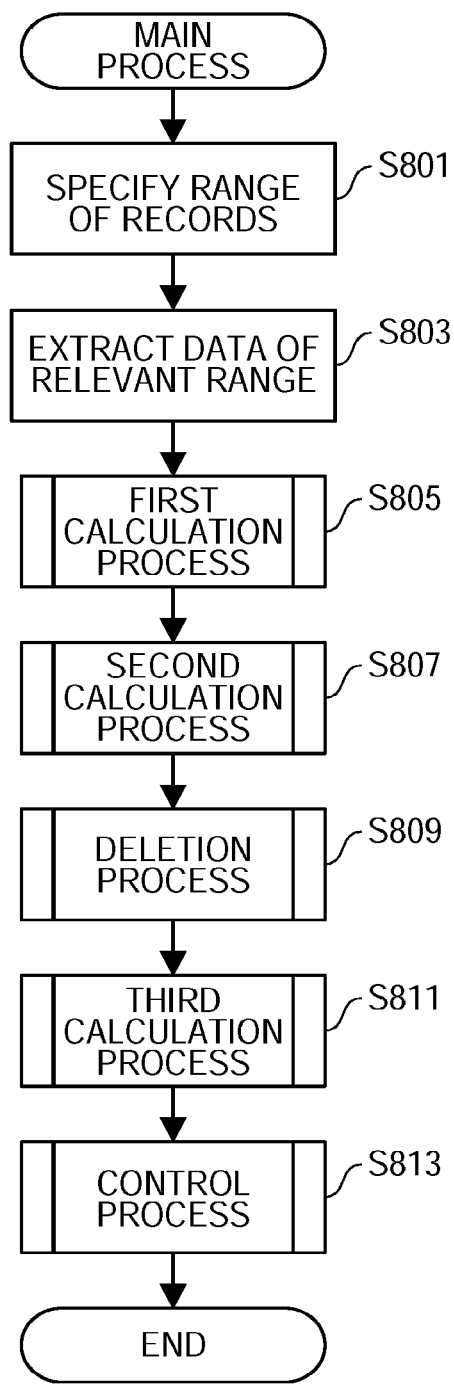
FIG. 8 is a diagram illustrating a flow of a main process.

FIG. 8 illustrates a flow of a main process. Among the measurement data stored in the first measurement data storage unit 725, the extraction unit 703 specifies a range of records to be referenced (S801). The latest record to a record preceding by a predetermined number from the latest record fall into the relevant range, for example. The extraction unit 703 extracts data of the relevant range from the first measurement data storage unit 725 and stores the extracted data of the relevant range in the second measurement data storage unit 727 (S803).

The first calculation unit 705 performs the first calculation process (S805). In the present embodiment, a first calculation process (A) is performed. In the first calculation process (A), dew-point temperatures are calculated.

Figure 9:
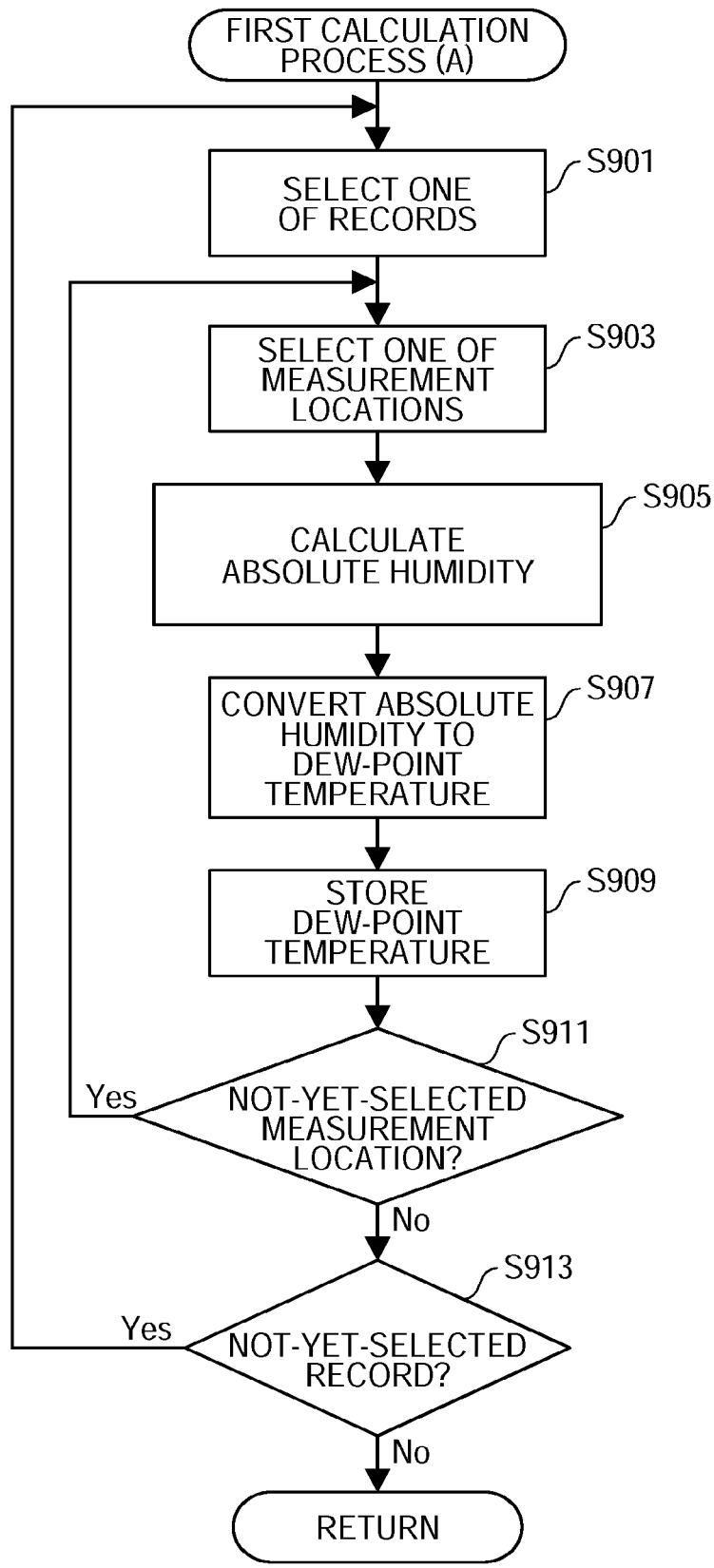
FIG. 9 is a diagram illustrating a flow of a first calculation process (A)

FIG. 9 illustrates a flow of the first calculation process (A). The first calculation unit 705 selects one of records in the measurement data stored in the second measurement data storage unit 727 (S901). The record is selected in accordance with a time series, for example.

The first calculation unit 705 selects one of measurement locations (S903). An order of selection is arbitrary. Based on relative humidity and a dry-bulb temperature in the relevant measurement location, the first calculation unit 705 calculates absolute humidity in the relevant measurement location (S905). A technique of the related art may be used for a method of calculating the absolute humidity on the basis of the relative humidity and the dry-bulb temperature. Furthermore, the first calculation unit 705 converts the absolute humidity to a dew-point temperature in the relevant measurement location (S907). A technique of the related art may be used for a method of converting the absolute humidity to the dew-point temperature. The first calculation unit 705 store, in a new field of the record selected in S901, the dew-point temperature in the measurement location (S909).

The first calculation unit 705 determines whether a not-yet-selected measurement location exists (S911). In a case where it is determined that a not-yet-selected measurement location exists, the process returns to S903 to repeat the above-described operations.

In a case where it is determined that no not-yet-selected measurement location exists, the first calculation unit 705 determines whether a not-yet-selected record exists (S913). In a case where it is determined that a not-yet-selected record exists, the process returns to S901 to repeat the above-described operations.

In a case where it is determined that no not-yet-selected record exists, the first calculation process (A) is terminated. Upon terminating the first calculation process (A), the process returns to the main process which has called the first calculation process (A).

Returning back to FIG. 8, the second calculation unit 707 performs the second calculation process (S807). In the present embodiment, second calculation process (A) is performed. In the second calculation process (A), the power consumption of the ICT system is calculated. The power consumption of the ICT system corresponds to the sum of power consumptions in the respective ICT devices 101.

Figure 10:
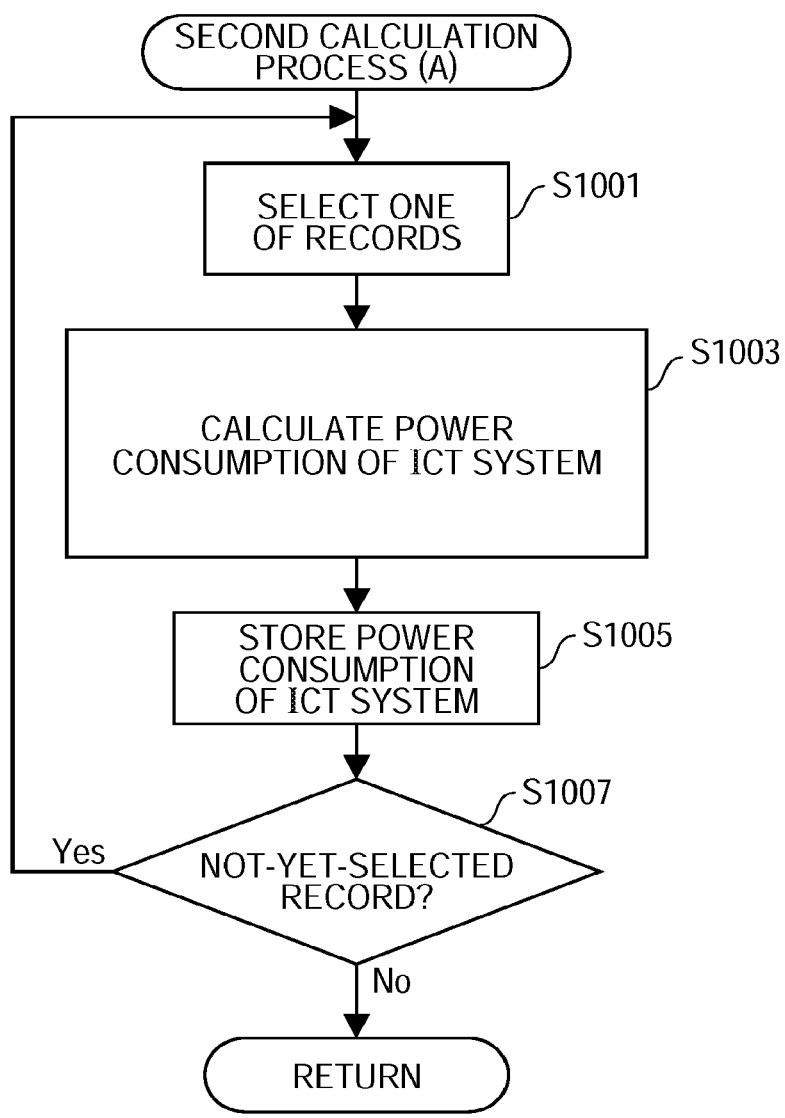
FIG. 10 is a diagram illustrating a flow of a second calculation process (A)

FIG. 10 illustrates a flow of the second calculation process (A). The second calculation unit 707 selects one of records in the measurement data stored in the second measurement data storage unit 727 (S1001). The record is selected in accordance with a time series, for example.

The second calculation unit 707 subtracts the power consumption of the air-conditioning system stored in the relevant record from the overall power consumption stored in the relevant record to calculate the power consumption of the ICT system (S1003). The second calculation unit 707 stores the calculated power consumption of the ICT system in a new field of the relevant record (S1005).

The second calculation unit 707 determines whether a not-yet-selected record exists (S1007). In a case where it is determined that a not-yet-selected record exists, the process returns to S1001 to repeat the above-described operations.

In a case where it is determined that no not-yet-selected record exists, the second calculation process (A) is terminated. Upon terminating the second calculation process (A), the process returns to the main process which has called the second calculation process (A).

Returning back to FIG. 8, the deletion unit 709 performs a deletion process (S809). In the deletion process, unnecessary data is deleted.

Figure 11:
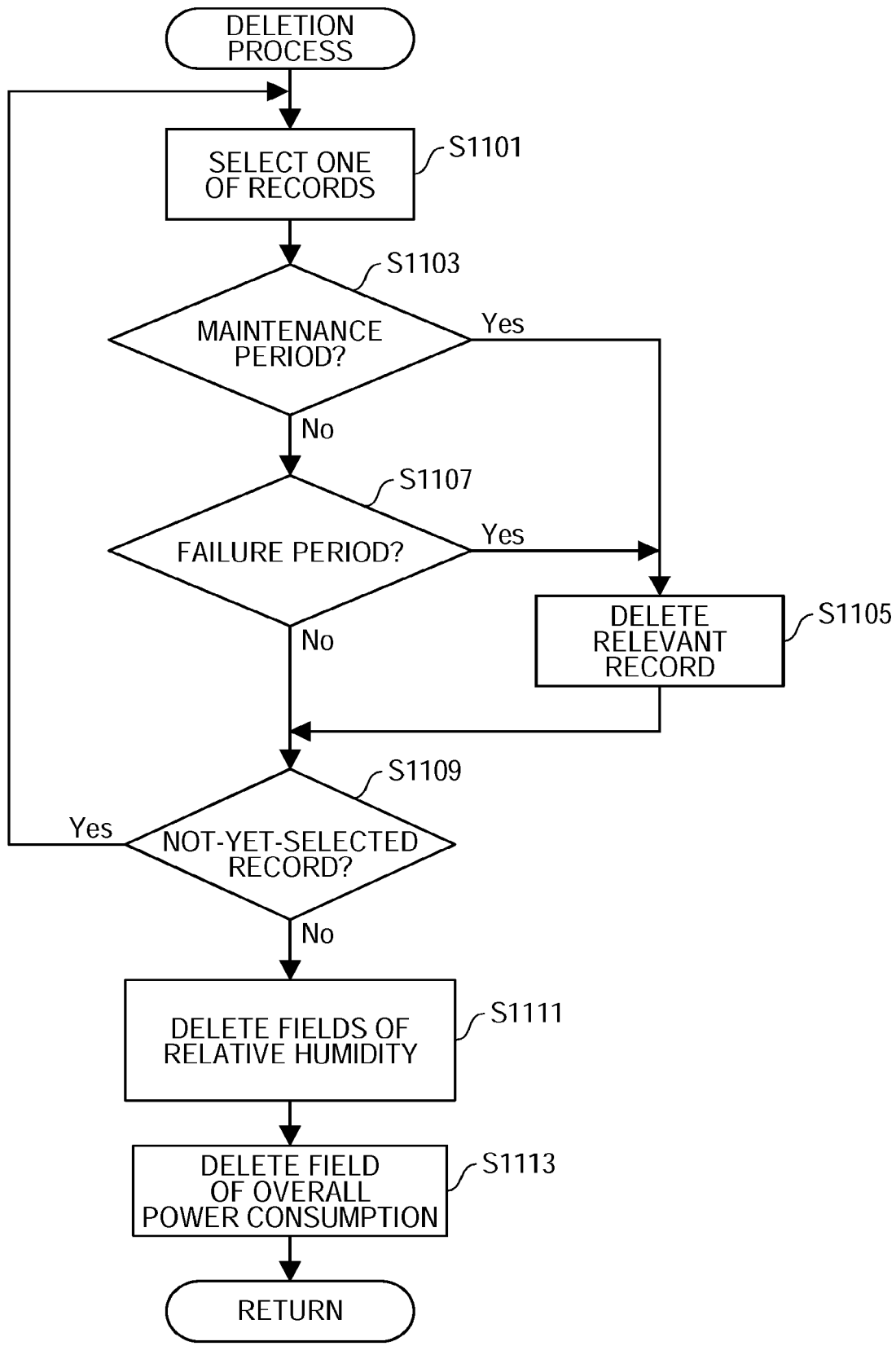
FIG. 11 is a diagram illustrating a flow of a deletion process.

FIG. 11 illustrates a flow of the deletion process. The deletion unit 709 selects one of records in the measurement data stored in the second measurement data storage unit 727 (S1101). The record is selected in accordance with a time series, for example.

The deletion unit 709 determines whether a measurement time and date of the relevant record falls into a maintenance period stored in the maintenance period storage unit 721 (S1103). In a case where it is determined that the measurement time and date of the relevant record falls into the maintenance period, the deletion unit 709 deletes the relevant record (S1105). Thereafter, the process proceeds to S1109.

In a case where it is determined that the measurement time and date of the relevant record does not fall into the maintenance period, the deletion unit 709 determines whether the measurement time and date of the relevant record falls into a failure period stored in the failure period storage unit 723 (S1107). In a case where it is determined that the measurement time and date of the relevant record falls into the failure period, the deletion unit 709 deletes the relevant record (S1105). In addition, the process proceeds to S1109.

In a case where it is determined that the measurement time and date of the relevant record does not fall into the failure period, the process proceeds to S1109.

The deletion unit 709 determines whether a not-yet-selected record exists (S1109). In a case where it is determined that a not-yet-selected record exists, the process returns to S1101 to repeat the above-described operations.

In a case where it is determined that no not-yet-selected record exists, the deletion unit 709 deletes fields of the relative humidity in the respective measurement locations (S1111). The deletion of the relevant fields is performed for the first record to the final record in the measurement data stored in the second measurement data storage unit 727.

Furthermore, the deletion unit 709 deletes the field of the overall power consumption (S1113). The deletion of the relevant field is performed for the first record to the final record in the measurement data stored in the second measurement data storage unit 727.

Note that S1107 may be omitted. In this case, the process proceeds to S1109 in a case where the determination result in S1103 is No. In addition, S1103 may be omitted. In this case, S1107 is performed subsequent to S1101.

Upon terminating the deletion process, the process returns to the main process which has called the deletion process.

Returning back to FIG. 8, the third calculation unit 711 performs a third calculation process (S811). In the third calculation process, values to be measured in the future are predicted based on, for example, Just-in-time (JIT) modeling. A technique of the related art may be used for the prediction process based on the JIT modeling. The prediction process based on the JIT modeling is disclosed in Masatoshi OGAWA and Harutoshi OGAI, "Application of Large-Scale Database-Based Online Modeling to Plant State Long-Term Estimation", *IEEJ Transactions on Electronics, Information and Systems*, Vol. 131 No. 4, P. 718-721, 2011. It is also disclosed in Shun USHIDA and Hidenori KIMURA, "Just-In-Time Approach to Nonlinear Identification and Control", *Journal of The Society of Instrument and Control Engineers*, Vol. 44 No. 2, P. 102-106, 2005. It is further disclosed in Anders Stenman, "Just-in-Time Models with Applications to Dynamical System", *Linkoping Studies in Science and Technology Thesis*, No. 601, March 1997.

Figure 12:
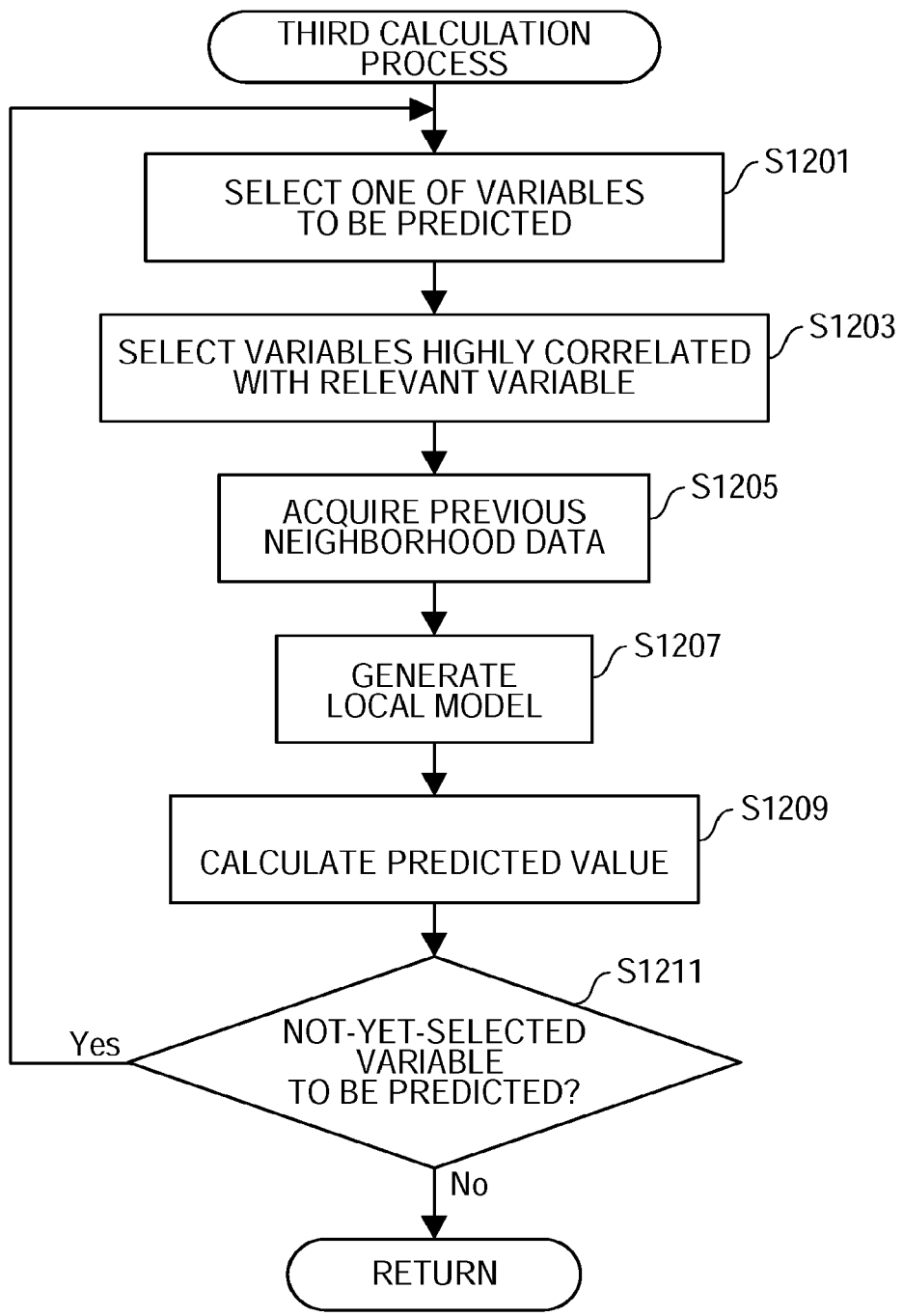
FIG. 12 is a diagram illustrating a flow of a third calculation process.

FIG. 12 illustrates a flow of the third calculation process. Since being a technique of the related art, the prediction process based on the JIT modeling will be simply described here.

The third calculation unit 711 selects one of variables to be predicted (S1201). In this example, any one of variables is to be predicted. In this regard, however, only some of the variables may be predicted. An order of selecting variables is arbitrary.

Based on the measurement data stored in the second measurement data storage unit 727, the third calculation unit 711 selects variables highly correlated with the variable to be predicted (S1203).

FIG. 13 illustrates examples of highly correlated variables. A case of predicting the dry-bulb temperature of the cold aisle is assumed, for example. In this example, highly correlated variables are selected from among individual variables between the last measurement timing and the third last measurement timing. In addition, it is assumed that a predicted value of the dry-bulb temperature of the cold aisle is highly correlated with the last dry-bulb temperature at an outlet point of an air conditioner A, the second last dry-bulb temperature at an outlet point of an outside air conditioner X, and the third last dew-point temperature at a return point of the air conditioner A.

The third calculation unit 711 acquires previous neighborhood data from the second measurement data storage unit 727 (S1205). A technique of the related art may be used for a method of identifying the previous neighborhood data.

Based on the previous neighborhood data, the third calculation unit 711 generates a local model (S1207). The local model is identified based on a polynomial expression obtained by multiplying the variables selected in S1203 by coefficients. A technique of the related art may be used for a method of generating the local model.

Based on the local model, the third calculation unit 711 calculates a predicted value (S1209). A technique of the related art may be used for a method of calculating the predicted value. The calculated predicted value is stored in the prediction data storage unit 729.

The third calculation unit 711 determines whether a not-yet-selected variable to be predicted exists (S1211). In a case where it is determined that a not-yet-selected variable to be predicted exists, the process returns to S1201 to repeat the above-described operations.

In a case where it is determined that no not-yet-selected variable to be predicted exists, the third calculation process is terminated. Upon terminating the third calculation process, the process returns to the main process which has called the third calculation process.

Returning back to FIG. 8, the control unit 713 performs a control process (S813). In the control process, individual equipments of the air-conditioning system are controlled based on individual predicted values. A technique of the related art may be used for a method of controlling the individual equipments of the air-conditioning system.

FIG. 14A to FIG. 14F illustrate a flow of the control process. In this regard, however, the control process is not limited to this example. The control unit 713 acquires, from the prediction data storage unit 729, a predicted value of a dry-bulb temperature Tc of the cold aisle and a predicted value of a dew-point temperature Dc of the cold aisle (S1401). Based on the predicted value of the dry-bulb temperature Tc of the cold aisle and the predicted value of the dew-point temperature Dc of the cold aisle, the control unit 713 calculates a predicted value of relative humidity Rc of the cold aisle (S1403).

The control unit 713 determines whether the predicted value of the dry-bulb temperature Tc of the cold aisle falls within an operation range (S1405). In a case where it is determined that the predicted value of the dry-bulb temperature Tc of the cold aisle does not fall within the operation range, the process proceeds to S1409.

In a case where it is determined that the predicted value of the dry-bulb temperature Tc of the cold aisle falls within the operation range, the control unit 713 determines whether the predicted value of the relative humidity Rc of the cold aisle falls within an operation range (S1407). In a case where it is determined that the predicted value of the relative humidity Rc of the cold aisle does not fall within the operation range, the process proceeds to S1409.

In a case where it is determined that the predicted value of the relative humidity Rc of the cold aisle falls within the operation range, the control process is terminated.

In S1409, the control unit 713 acquires, from the prediction data storage unit 729, a predicted value of a dry-bulb temperature To of outside air and a predicted value of a dew-point temperature Do of the outside air. Furthermore, the control unit 713 acquires, from the prediction data storage unit 729, a predicted value of the power consumption Pi of all the ICT devices 101 (S1411). Furthermore, the control unit 713 acquires, from the prediction data storage unit 729, predicted values of dry-bulb temperatures Tr of return points of the respective air conditioners 103 and predicted values of respective dew-point temperatures Dr thereof (S1413). Furthermore, the control unit 713 acquires, from the prediction data storage unit 729, predicted values of dry-bulb temperatures Tr of return points of the respective outside air conditioners 105 and predicted values of respective dew-point temperatures Dr thereof (S1415). Thereafter, the process proceeds to S1417 illustrated in FIG. 14B.

The control unit 713 determines whether a predicted value of the dry-bulb temperature To of the outside air exceeds an upper limit of an operation range (S1417). In a case where it is determined that the predicted value of the dry-bulb temperature To of the outside air exceeds the upper limit of the operation range, the process proceeds to S1421.

In a case where the predicted value of the dry-bulb temperature To of the outside air does not exceed the upper limit of the operation range, the control unit 713 determines whether the predicted value of the dew-point temperature Do of the outside air exceeds an upper limit of an operation range (S1419). In a case where it is determined that the predicted value of the dew-point temperature Do of the outside air exceeds the upper limit of the operation range, the process proceeds to S1421.

The control unit 713 sets an operation rate of a fan of each of the air conditioners 103 and an operation rate of the damper 107 in a return path to each of the air conditioners 103 to "1" (S1421). The control unit 713 sets an operation rate of a cooling and heating device of each of the air conditioners 103 to ((the predicted value of the dry-bulb temperature Tr of the return point of the relevant air conditioner 103−the predicted value of the dry-bulb temperature To of the outside air)/10) (S1423). Furthermore, the control unit 713 sets, to "0", an operation rate of a fan of each of the outside air conditioners 105 and an operation rate of a dehumidifying and humidifying device of each of the outside air conditioners 105 (S1425). Thereafter, the control process is terminated, and the process returns to the main process which has called the control process.

Figure 14A:
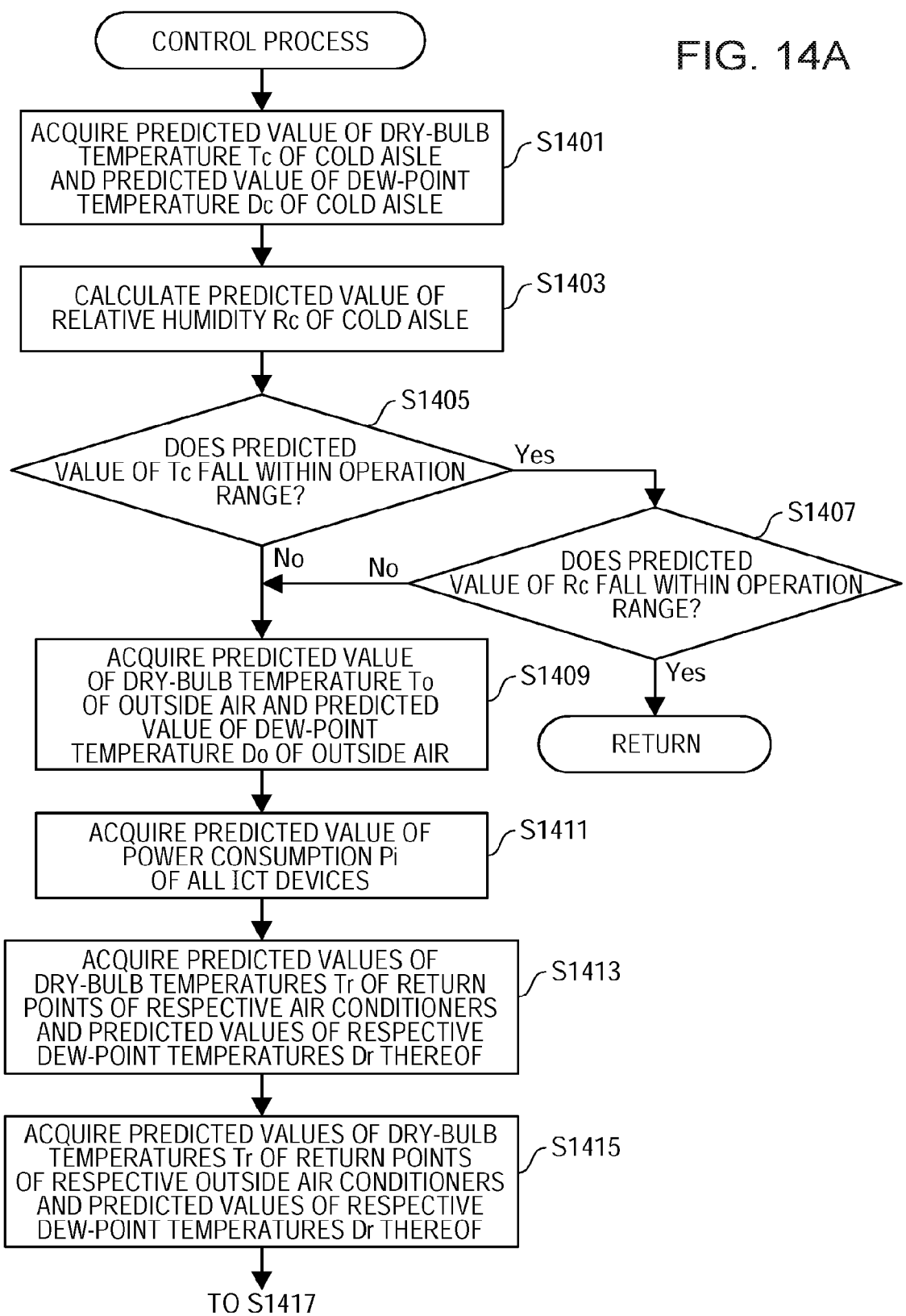
Figure 14C:
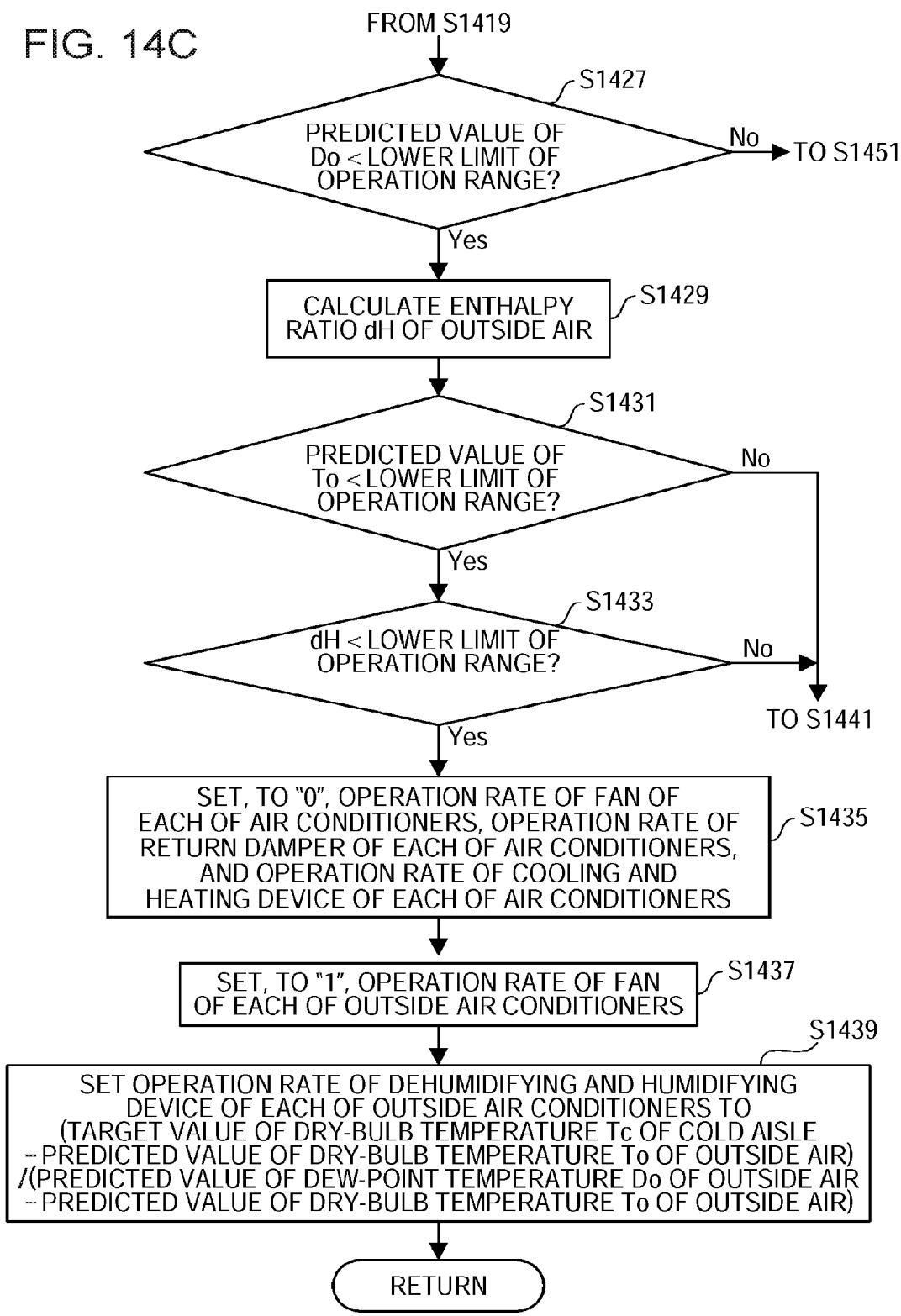

In a case where it is determined that the predicted value of the dew-point temperature Do of the outside air does not exceed the upper limit of the operation range in S1419, the process proceeds to S1427 illustrated in FIG. 14C.

The control unit 713 determines whether the predicted value of the dew-point temperature Do of the outside air falls below a lower limit of the operation range (S1427). In a case where it is determined that the predicted value of the dew-point temperature Do of the outside air falls below the lower limit of the operation range, the control unit 713 calculates an enthalpy ratio dH of the outside air, based on the dry-bulb temperature To of the outside air and the absolute humidity of the outside air (S1429). A technique of the related art may be used for a method of calculating the enthalpy ratio dH, based on the dry-bulb temperature and the absolute humidity.

The control unit 713 determines whether the predicted value of the dry-bulb temperature To of the outside air falls below a lower limit of the operation range (S1431). In a case where it is determined that the predicted value of the dry-bulb temperature To of the outside air falls below the lower limit of the operation range, the control unit 713 further determines whether the enthalpy ratio dH of the outside air falls below a lower limit of an operation range (S1433). In a case where it is determined that the enthalpy ratio dH of the outside air falls below the lower limit of the operation range, the process proceeds to S1435.

The control unit 713 sets, to "0", an operation rate of a fan of each of the air conditioners 103, an operation rate of the damper 107 in a return path to each of the air conditioners 103, and an operation rate of a cooling and heating device of each of the air conditioners 103 (S1435). The control unit 713 sets, to "1", an operation rate of a fan of each of the outside air conditioners 105 (S1437). In addition, the control unit 713 sets an operation rate of a dehumidifying and humidifying device of each of the outside air conditioners 105 to (a target value of the dry-bulb temperature Tc of the cold aisle−the predicted value of the dry-bulb temperature To of the outside air)/(the predicted value of the dew-point temperature Do of the outside air−the predicted value of the dry-bulb temperature To of the outside air) (S1439). Thereafter, the control process is terminated, and the process returns to the main process which has called the control process.

Figure 14D:
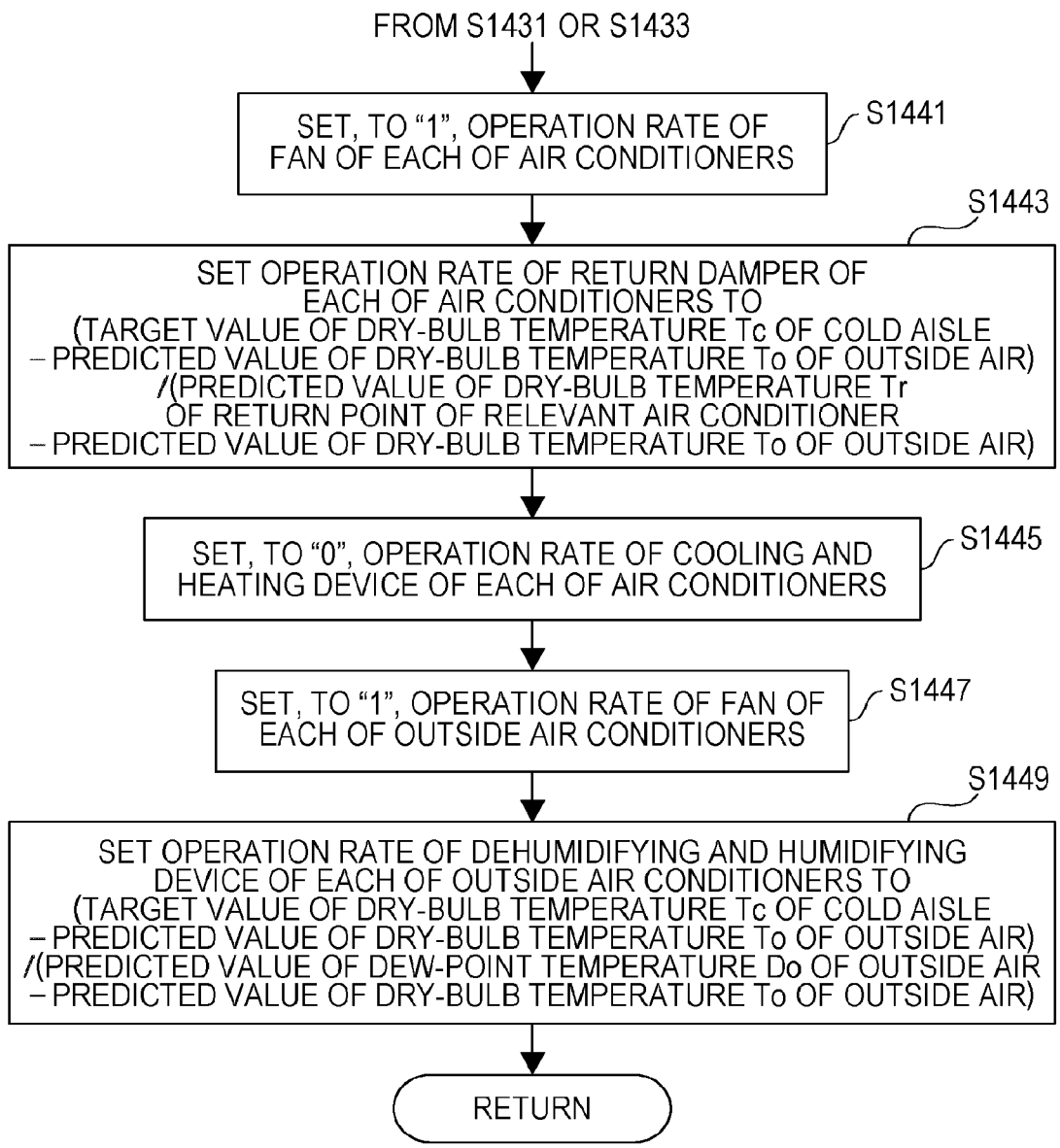

In a case where it is determined that the predicted value of the dry-bulb temperature To of the outside air does not fall below the lower limit of the operation range in S1431 or in a case where it is determined that the enthalpy ratio dH of the outside air does not fall below the lower limit of the operation range in S1433, the process proceeds to S1441 illustrated in FIG. 14D.

The control unit 713 sets an operation rate of a fan of each of the air conditioners 103 to "1" (S1441). The control unit 713 sets an operation rate of the damper 107 in a return path to each of the air conditioners 103 to (the target value of the dry-bulb temperature Tc of the cold aisle−the predicted value of the dry-bulb temperature To of the outside air)/(the predicted value of the dry-bulb temperature Tr of the return point of the relevant air conditioner 103−the predicted value of the dry-bulb temperature To of the outside air) (S1443). The control unit 713 sets an operation rate of a cooling and heating device of each of the air conditioners 103 to "0" (S1445). The control unit 713 sets an operation rate of a fan of each of the outside air conditioners 105 to "1" (S1447). In addition, the control unit 713 sets an operation rate of a dehumidifying and humidifying device of each of the outside air conditioners 105 to (a target value of the dry-bulb temperature Tc of the cold aisle−the predicted value of the dry-bulb temperature To of the outside air)/(the predicted value of the dew-point temperature Do of the outside air−the predicted value of the dry-bulb temperature To of the outside air) (S1449). Thereafter, the control process is terminated, and the process returns to the main process which has called the control process.

In a case where it is determined that the predicted value of the dew-point temperature Do of the outside air does not fall below the lower limit of the operation range in S1427, the process proceeds to S1451 illustrated in FIG. 14E.

Based on the predicted value of the dry-bulb temperature To of the outside air and the predicted value of the dew-point temperature Do of the outside air, the control unit 713 calculates a predicted value of relative humidity Ro of the outside air (S1451). A technique of the related art may be used for a method of calculating the relative humidity, based on the dry-bulb temperature and the dew-point temperature.

The control unit 713 determines whether the predicted value of the dry-bulb temperature To of the outside air falls below the lower limit of the operation range (S1453). In a case where it is determined that the predicted value of the dry-bulb temperature To of the outside air falls below the lower limit of the operation range, the process proceeds to S1457.

In a case where it is determined that the predicted value of the dry-bulb temperature To of the outside air does not fall below the lower limit of the operation range, the control unit 713 determines whether the predicted value of the relative humidity Ro of the outside air exceeds an upper limit of an operation range (S1455). In a case where it is determined that the predicted value of the relative humidity Ro of the outside air exceeds the upper limit of the operation range, the process proceeds to S1457.

The control unit 713 sets an operation rate of a fan of each of the air conditioners 103 to "1" (S1457). The control unit 713 sets an operation rate of the damper 107 in a return path to each of the air conditioners 103 to (the target value of the dry-bulb temperature Tc of the cold aisle−the predicted value of the dry-bulb temperature To of the outside air)/(the predicted value of the dry-bulb temperature Tr of the return point of the relevant air conditioner 103−the predicted value of the dry-bulb temperature To of the outside air) (S1459). The control unit 713 sets an operation rate of a cooling and heating device of each of the air conditioners 103 to "0" (S1461). The control unit 713 sets an operation rate of a fan of each of the outside air conditioners 105 to "1" (S1463). In addition, the control unit 713 sets an operation rate of a dehumidifying and humidifying device of each of the outside air conditioners 105 to "0" (S1465). Thereafter, the control process is terminated, and the process returns to the main process which has called the control process.

Figure 14F:
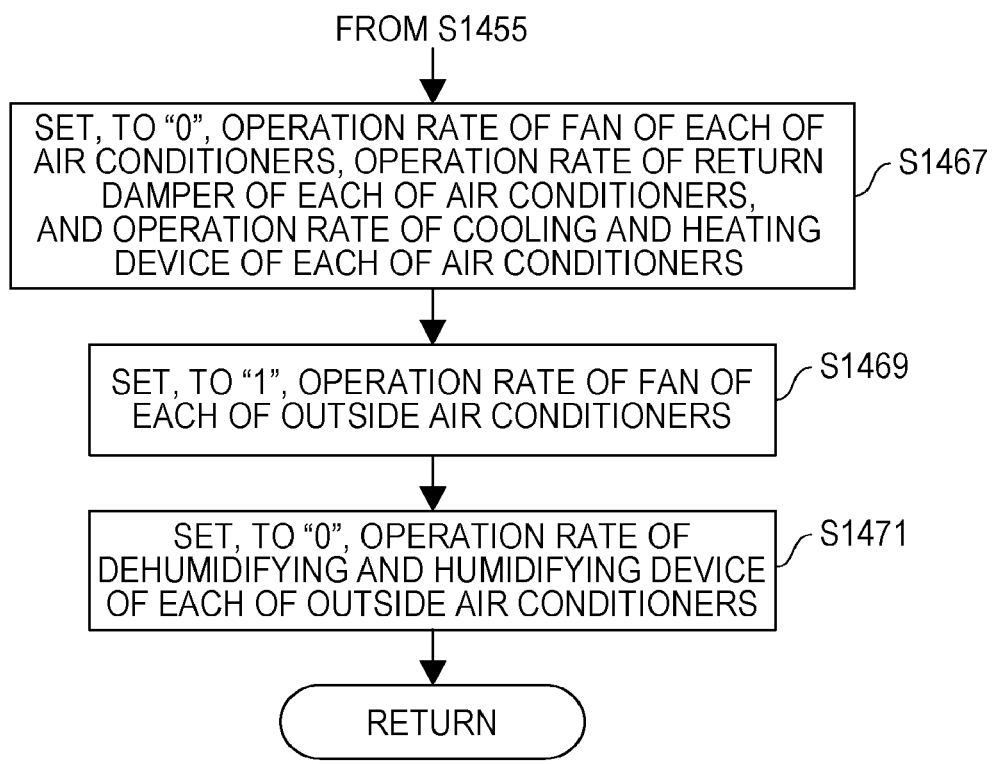

In a case where it is determined that the predicted value of the relative humidity Ro of the outside air does not exceed the upper limit of the operation range in S1455, the process proceeds to S1467 illustrated in FIG. 14F.

The control unit 713 sets, to "0", an operation rate of a fan of each of the air conditioners 103, an operation rate of the damper 107 in a return path to each of the air conditioners 103, and an operation rate of a cooling and heating device of each of the air conditioners 103 (S1467). The control unit 713 sets an operation rate of a fan of each of the outside air conditioners 105 to "1" (S1469). In addition, the control unit 713 sets an operation rate of a dehumidifying and humidifying device of each of the outside air conditioners 105 to "0" (S1471). Thereafter, the control process is terminated, and the process returns to the main process which has called the control process.

As illustrated in FIG. 8, upon terminating the control process, the main process is terminated.

According to the present embodiment, it is possible to more correctly predict measurement parameters related to the air conditioning of the ICT equipment room.

Data measured during maintenance of the ICT system and/or during failure thereof is deleted. Accordingly, it is possible to more correctly predict measurement parameters during a normal operation of the ICT system.

The dew-point temperature is an indicator independent of the dry-bulb temperature. Therefore, it becomes easy to reflect, in a prediction, the influence of the amount of moisture within gas.

Furthermore, in an aspect, it is possible to reflect, in a prediction, the influence of an operation of the ICT system while separating the influence of the operation of the ICT system from the influence of an operation of the air-conditioning system.

Second Embodiment

In the above-described embodiment, there is described an example of obtaining the power consumption of the ICT system in a case where the overall power consumption and the power consumption of the air-conditioning system are stored in the measurement data. In the present embodiment, there will be described an example of obtaining the power consumption of the air-conditioning system in a case where the overall power consumption and the power consumption of the ICT system are stored in the measurement data.

It is assumed that, in the example of the measurement data illustrated in FIG. 2A and FIG. 2B, there are no fields in which the power consumptions of the respective equipments of the air-conditioning system and the power consumption of the air-conditioning system are stored. In addition, it is assumed that, in place thereof, there is a field in which the power consumption of the ICT system is stored.

Figure 15:
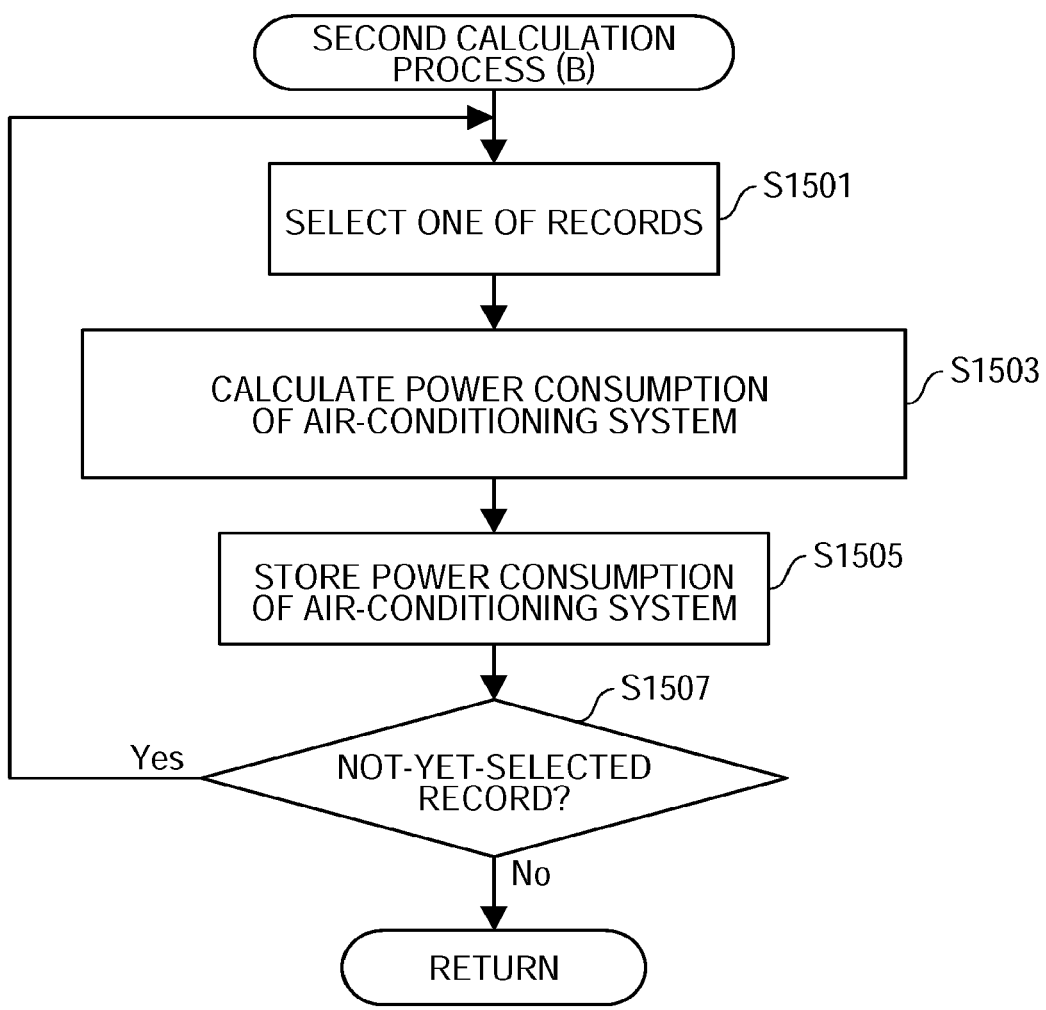
FIG. 15 is a diagram illustrating a flow of second calculation process (B)

In the present embodiment, in place of the second calculation process (A), second calculation process (B) is performed. FIG. 15 illustrates a flow of the second calculation process (B). The second calculation unit 707 selects one of records in the measurement data stored in the second measurement data storage unit 727 (S1501). The second calculation unit 707 subtracts the power consumption of the ICT system from the overall power consumption to calculate the power consumption of the air-conditioning system (S1503). The second calculation unit 707 stores the power consumption of the air-conditioning system in a new field of the relevant record (S1505).

The second calculation unit 707 determines whether a not-yet-selected record exists (S1507). In a case where it is determined that a not-yet-selected record exists, the process returns to S1501 to repeat the above-described operations. In a case where it is determined that no not-yet-selected record exists, the second calculation process (B) is terminated, and the process returns to the main process which has called the second calculation process (B).

According to the present embodiment, it is possible to reflect, in a prediction, the influence of an operation of the air-conditioning system while separating the influence of the operation of the air-conditioning system from the influence of an operation of the ICT system.

Third Embodiment

In the above-described embodiments, an example of using the dew-point temperature in place of the relative humidity is described. In the present embodiment, an example of using absolute humidity in place of the relative humidity will be described.

Figure 16:
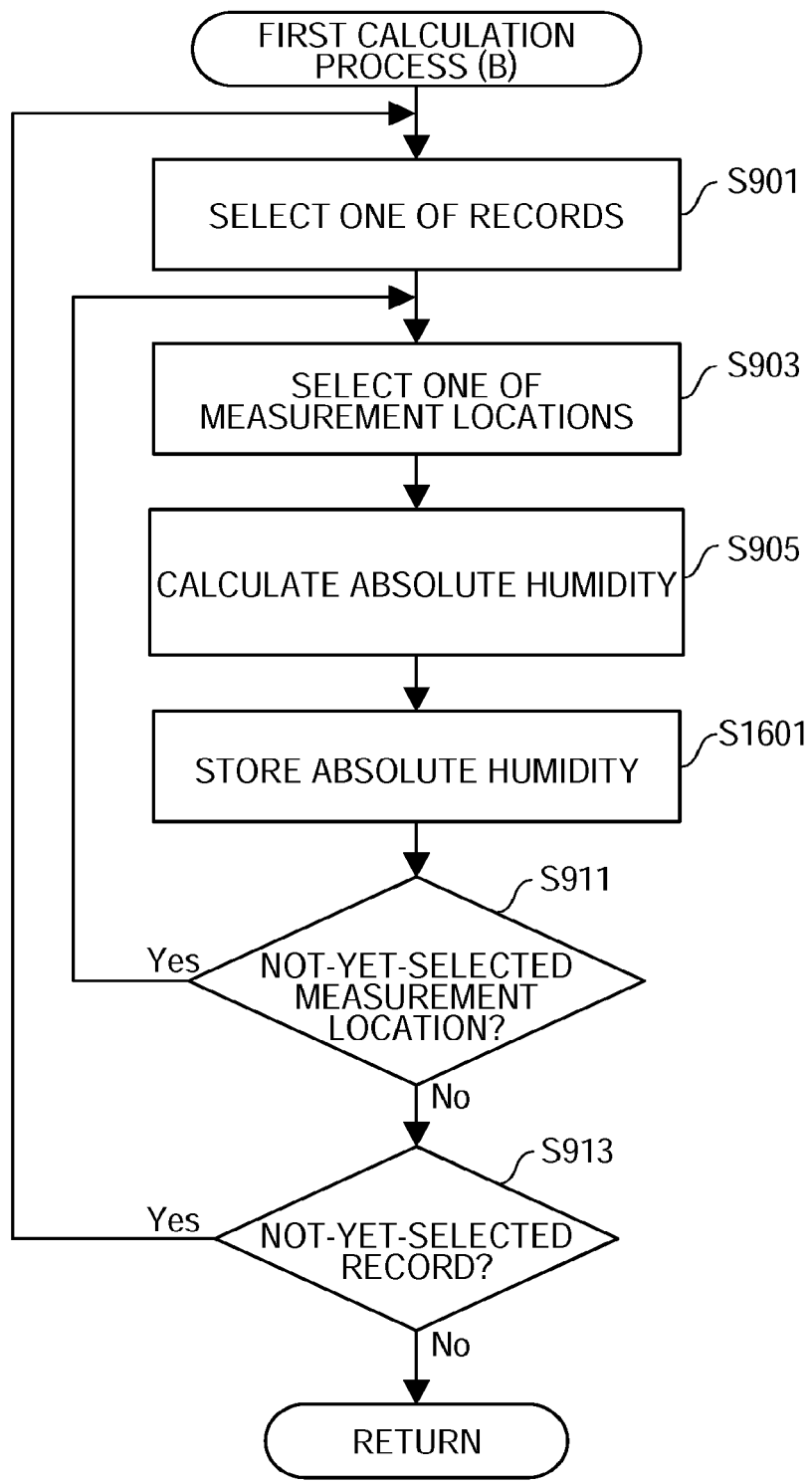
FIG. 16 is a diagram illustrating a flow of first calculation process (B)

In the present embodiment, in place of the first calculation process (A), first calculation process (B) is performed. FIG. 16 illustrates a flow of the first calculation process (B). S901 to S905 are the same as those in a case of FIG. 9. In place of the dew-point temperature, the first calculation unit 705 stores absolute humidity in a new field of the record selected in S901 (S1601). S911 and S913 are the same as those in a case of FIG. 9. Note that the absolute humidity is an indicator independent of the dry-bulb temperature.

According to the present embodiment, it becomes easy to reflect, in a prediction, the influence of the amount of moisture within gas.

While embodiments are described, the present technology is not limited to these. The above-described functional configuration may be inconsistent with a program module configuration, for example.

In addition, the configuration of each of the storage areas described above is just an example, and a configuration other than the above-described configuration may be adopted. Furthermore, in a case where a processing result does not change in a flow of a process, an order of the operations may be changed or the operations may be performed in parallel.

Note that the above-described management device 113 is a computer device which includes a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for coupling to a network as illustrated in FIG. 17. These components are coupled to one another by a bus 2519. An operating system (OS) and an application program for implementing the processes in the present embodiments are stored in the HDD 2505 and are read from the HDD 2505 to the memory 2501 to be executed by the CPU 2503. In accordance with the application program, the CPU 2503 controls the display control unit 2507, the communication control unit 2517, and the drive device 2513 to perform predetermined operations. While being mainly stored in the memory 2501, data in process may be stored in the HDD 2505. In embodiments of the present technology, the application program for implementing the above-described processes is distributed while being stored in the computer-readable removable disk 2511 and is installed into the HDD 2505 from the drive device 2513. The application program may be installed into the HDD 2505 via a network such as the Internet and the communication control unit 2517. Pieces of hardware such as the CPU 2503 and the memory 2501, described above, and programs such as the OS and the application program organically collaborate with one another, thereby causing such a computer device to realize such various kinds of functions as described above.

The above-described embodiments of the present technology are summarized as follows.

A management device according to the present embodiments includes (A) measurement units installed in individual measurement locations located outside an installation room in which an information processing device is installed, in a gas path in an air-conditioning system of the installation room, and inside the installation room, (B) a storage unit configured to store therein measurement data individually measured by the measurement units in a time-series manner, (C) a deletion unit configured to delete unnecessary data from the measurement data, and (D) a calculation unit configured to calculate, based on the measurement data from which the unnecessary data is deleted, a predicted value of the measurement data in at least one measurement location out of the measurement locations.

By doing so, it is possible to more correctly predict measurement parameters related to air conditioning of the installation room of the information processing device.

The above-described deletion unit may delete data measured during maintenance of the above-described information processing device and/or during failure thereof.

By doing so, it is possible to more correctly predict measurement parameters during a normal operation of the information processing device.

The measurement data may include a dry-bulb temperature and relative humidity. The above-described management device may further include a first calculation unit configured to calculate, based on the dry-bulb temperature and the relative humidity, a dew-point temperature to be added to the measurement data. In addition, the above-described deletion unit may delete the relative humidity included in the measurement data.

By doing so, it becomes easy to reflect, in a prediction, the influence of the amount of moisture within gas.

The measurement data may include a dry-bulb temperature and relative humidity. The above-described management device may further include a second calculation unit configured to calculate, based on the dry-bulb temperature and the relative humidity, absolute humidity to be added to the measurement data. The above-described deletion unit may delete the relative humidity included in the measurement data.

By doing so, it becomes easy to reflect, in a prediction, the influence of the amount of moisture within gas.

The measurement data may include first power consumption of an entire facility and second power consumption of the air-conditioning system. The above-described management device may further include a third calculation unit configured to calculate, based on the first power consumption and the second power consumption, third power consumption of an information system including the above-described information processing, which is to be added to the measurement data. The above-described deletion unit may delete the first power consumption included in the measurement data.

By doing so, it is possible to reflect, in a prediction, the influence of an operation of the information system while separating the influence of the operation of the information system from the influence of an operation of the air-conditioning system.

The measurement data may include first power consumption of an entire facility and second power consumption of an information system including the above-described information processing device. The above-described management device may further include a fourth calculation unit configured to calculate, based on the first power consumption and the second power consumption, third power consumption of the air-conditioning system, which is to be added to the measurement data. The above-described deletion unit may delete the first power consumption included in the measurement data.

By doing so, it is possible to reflect, in a prediction, the influence of an operation of the air-conditioning system while separating the influence of the operation of the air-conditioning system from the influence of an operation of the information system.

Furthermore, a control unit configured to control, based on the predicted value, individual equipments of the air-conditioning system may be included.

By doing so, it is possible to cause the air-conditioning system to adequately operate.

Note that it is possible to create a program for causing a computer to perform the above-described processes of the management device and that the relevant program may be stored in a computer-readable storage medium or storage device such as, for example, a flexible disk, a compact disc read-only memory (CD-ROM), a magneto-optical disk, a semiconductor memory, or a hard disk. Note that in general an intermediate processing result is temporarily saved in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device, comprising:
    a memory; and
    a processor coupled to the memory and the processor configured to:
        collect measurement data from sensors installed in respective measurement locations including outside an installation room in which an information processing device is installed, in a gas path in an air-conditioning system of the installation room, and inside the installation room, the measurement data being data measured by the respective sensors;
        store the measurement data in the memory;
        delete unnecessary data from the measurement data stored in the memory; and
        calculate a predicted value in at least one measurement location of the measurement locations on basis of the measurement data from which the unnecessary data is deleted, the predicted value being a value of data predicted to be measured by any of the sensors.

2. The management device according to claim 1, wherein the processor is configured to:
    delete, as the unnecessary data, measurement data measured during maintenance of the information processing device or during failure of the information processing device.

3. The management device according to claim 1, wherein the measurement data includes a dry-bulb temperature and relative humidity, and
    the processor is configured to:
        calculate a dew-point temperature on basis of the dry-bulb temperature and the relative humidity;
        add the calculated dew-point temperature to the measurement data stored in the memory; and
        delete the relative humidity included in the measurement data stored in the memory.

4. The management device according to claim 1, wherein the measurement data includes a dry-bulb temperature and relative humidity, and
    the processor is configured to:
        calculate absolute humidity on basis of the dry-bulb temperature and the relative humidity;
        add the calculated absolute humidity to the measurement data stored in the memory; and
        delete the relative humidity included in the measurement data stored in the memory.

5. The management device according to claim 1, wherein the measurement data includes first power consumption of an entire facility and second power consumption of the air-conditioning system, the facility including the air-conditioning system and an information system including the information processing device, and
    the processor is configured to:

calculate third power consumption of the information system on basis of the first power consumption and the second power consumption;

add the calculated third power consumption to the measurement data stored in the memory; and delete the first power consumption included in the measurement data stored in the memory.

6. The management device according to claim 1, wherein the measurement data includes first power consumption of an entire facility and second power consumption of an information system including the information processing device, the facility including the air-conditioning system and the information system, and the processor is configured to:

calculate third power consumption of the air-conditioning system on basis of the first power consumption and the second power consumption;

add the calculated third power consumption to the measurement data stored in the memory; and delete the first power consumption included in the measurement data stored in the memory.

7. The management device according to claim 1, wherein the processor is configured to:

control respective equipments of the air-conditioning system on basis of the predicted value.

8. A management system, comprising:

sensors installed in respective measurement locations including outside an installation room in which an information processing device is installed, in a gas path in an air-conditioning system of the installation room, and inside the installation room; and a management device including:

a memory; and a processor coupled to the memory and the processor configured to:

collect measurement data from the respective sensors, the measurement data being data measured by the respective sensors;

store the measurement data in the memory;

delete unnecessary data from the measurement data stored in the memory; and calculate a predicted value in at least one measurement location of the measurement locations on basis of the measurement data from which the unnecessary data is deleted, the predicted value being a value of data predicted to be measured by any of the sensors.

9. A non-transitory computer-readable recording medium having stored therein a program that causes a computer to execute a process, the process comprising:

collecting measurement data from sensors installed in respective measurement locations including outside an installation room in which an information processing device is installed, in a gas path in an air-conditioning system of the installation room, and inside the installation room, the measurement data being data measured by the respective sensors;

storing the measurement data in the memory;

deleting unnecessary data from the measurement data stored in the memory; and calculating a predicted value in at least one measurement location of the measurement locations on basis of the measurement data from which the unnecessary data is deleted, the predicted value being a value of data predicted to be measured by any of the sensors.

* * * * *